(12) United States Patent
Kamata et al.

(10) Patent No.: US 6,714,198 B2
(45) Date of Patent: Mar. 30, 2004

(54) PROGRAM AND APPARATUS FOR DISPLAYING GRAPHICAL OBJECTS

(75) Inventors: Seiichi Kamata, Kawasaki (JP); Fujio Sato, Kawasaki (JP); Yukio Hirayama, Kawasaki (JP); Keisuke Imaizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 287 days.

(21) Appl. No.: 09/985,774

(22) Filed: Nov. 6, 2001

(65) Prior Publication Data
US 2003/0206166 A1 Nov. 6, 2003

(30) Foreign Application Priority Data

Jun. 8, 2001 (JP) ........................................ 2001-173551

(51) Int. Cl.[7] .............................................. G06T 15/00
(52) U.S. Cl. ....................................................... 345/427
(58) Field of Search ................................. 345/419, 421, 345/422, 427, 619, 625

(56) References Cited

U.S. PATENT DOCUMENTS 5,574,836 A * 11/1996 Broemmelsiek ............ 345/427
6,234,901 B1 * 5/2001 Nagoshi et al. ............... 463/33
6,323,895 B1 * 11/2001 Sata ............................. 348/39

* cited by examiner

Primary Examiner—Phu K. Nguyen
(74) Attorney, Agent, or Firm—Staas & Halsey LLP

(57) ABSTRACT

A computer program and apparatus for displaying an image of graphical objects viewed from a certain eye point, which permit the user to select either a fixed up direction or a variable up direction when manipulating the eye point location. The program first determines which movement mode to use, according to a given user action. It then calculates the eye point coordinates and a line-of-sight vector according to the user action and the determined movement mode. When the mode is fixed up-direction mode, the up direction of the projection plane is set to a predefined direction. When it is variable up-direction mode, some predetermined rules are applied to determine the up direction. Given objects are perspective-projected on the projection plane being oriented in the determined up direction, based on the calculated eye point coordinates and line-of-sight vector. The resulting object image is then displayed on a monitor screen.

12 Claims, 19 Drawing Sheets

111 VIEW PARAMETER DATABASE

| | |
|---|---|
| EYE POINT COORDINATES E | (Ex,Ey,Ez) |
| LINE-OF-SIGHT VECTOR V | (Vx,Vy,Vz) |
| UP VECTOR U | (Ux,Uy,Uz) |
| PROJECTION PLANE'S DISTANCE FROM EYE POINT | D |
| PROJECTION PLANE'S NORMAL VECTOR Sn | (Sx,Sy,Sz) |
| WINDOW SIZE | Wx,Wy |

FIG. 6

PROGRAM AND APPARATUS FOR DISPLAYING GRAPHICAL OBJECTS

BACKGROUND OF THE INVENTION

1. Field of the Invention

The present invention relates to a program and apparatus which draw and display graphical objects in a three-dimensional virtual space, and more particularly to a program and apparatus which draw and display graphical objects in a motion video according to a user-specified eye point and direction parameters.

2. Description of the Related Art

Computer graphics technologies have enabled us to construct a virtual environment within a computer system by arranging many graphical objects in a three-dimensional virtual space. Such graphical objects are created with a three-dimensional computer-aided design (CAD) system or similar tools, and the user can view the images of those objects on a computer monitor screen, from various viewpoints and angles.

Technically, to realize a simulated environment, an X-Y-Z virtual space is defined in a computer to accommodate one or more graphical objects. This virtual space is oriented to an appropriate direction, depending on the purpose of simulation. When simulating, for example, a city street environment, the positive Z-axis direction of the space is supposed to match with the direction against gravity in our real world. An eye point is then defined in such a virtual space, and a projection plane is set to a certain place between the eye point and objects to be viewed. The projection plane corresponds to a computer screen that the user is watching, on which the images of graphical objects are projected. The orientation of the projection plane is specified as a vector directing to the plane's upward direction, hence the name "up vector."

FIG. 19 shows a conventional modeling of a three-dimensional virtual space. Arranged in the illustrated virtual space are: an eye point 501, an object 502, and a projection plane 503. Line-of-sight vector V is defined as a vector extending from the eye point 501 toward the object 502. The projection plane 503 is located between the eye point 501 and object 502, the upward direction of which is determined by an up vector U. By definition, the up vector U is perpendicular to the line-of-sight vector V. Since the up vector U is not restricted to any particular direction in the virtual space, the user is allowed to view the object 502 from any angles by manipulating the line-of-sight vector V and up vector U. For example, the user can even get an up-side-down view of the object 502 by reversing the direction of the up vector U. This flexibility serves as a very effective tool for mechanical engineering, in which designers need to review a component or workpiece on a computer monitor screen from various directions.

In most situations in the real world, as opposed to virtual environments, our eye sight is oriented vertically (i.e., we all assume that the direction opposite to gravity is our default "up direction"). In other words, the up vector in our real life is almost fixed to the direction against gravity. This fact justifies having the up vector U fixed to the upward direction (or Z-axis) of the three-dimensional virtual space in realizing a walk-through animation which simulates an environment we ordinarily see in real life. Such a vertically fixed setup of the projection plane prevents the object 502 from looking as if it were inverted or tilted, and in ordinary city street simulations, the viewers would feel this fixed setup comfortable and usable, even though they are not allowed to look up at the sky or look down at the ground.

As explained above, conventional object displaying programs have their own algorithms to determine an up vector, depending on the purpose of the programs. When the user needs, for example, to view a single object from various directions, the program defines such an up vector that is perpendicular to the line-of-sight vector. When the user wishes to walk through a virtual street, the program uses an up vector being set in a vertical direction of the virtual environment.

In the real world, however, people often change their way of seeing objects, and this change happens even in a continuous series of actions. Suppose, for example, such a situation where a person is walking in a house in an attempt to find and enter to a particular room. At the first stage, he/she has a broader interest about the environment, including the route to the destination. When he/she has reached the destination and entered the room, the person's interest may then be turned to a particular object he/she finds in the room. Now he/she may wish to check the shape of that object by viewing it from different directions. To simulate the above scenes continuously in a three-dimensional virtual space, the object displaying program or system has to be more flexible in redefining the up vector.

The conventional programs or systems, however, fail to provide flexibility; they only allow the user to define the up vector in a predetermined way. One program offers an up vector in a vertical direction of the three-dimensional virtual space. This would be fine when the user walks around in the virtual space, since it is close to his/her familiar world where a direction opposite to the gravity is the inherent up direction. However, with the same up vector, the user would not be able to check a particular object from multiple viewpoints. While an up vector perpendicular to the line-of-sight vector is suitable for the latter purpose, this type of up vector definition is not preferable when the user needs a wider scope so as to check, for example, the entire room containing objects.

SUMMARY OF THE INVENTION

In view of the foregoing, it is an object of the present invention to provide an object displaying program or apparatus which permits the user to change the up direction of the projection plane flexibly in a real time fashion while viewing a motion video.

To accomplish the above object, according to the present invention, there is provided a computer program product which draws and displays an image of given objects in a three-dimensional virtual space. When executed on a computer system, this program performs the following processing steps: (a) determining which movement mode to use, according to a given user action; (b) calculating eye point coordinates and a line-of-sight vector, according to the given user action and the determined movement mode; (c) when the determined movement mode is fixed up-direction mode, setting an up direction of a projection plane to a predetermined direction; (d) when the determined movement mode is variable up-direction mode, determining the up direction of the projection plane according to predetermined rules; (e) performing a perspective transformation of the given objects onto the projection plane being oriented to the determined up direction, based on the determined eye point coordinates and line-of-sight vector, thereby creating an image of the given objects; and (f) displaying the created image.

Further, to accomplish the above object, the present invention provides an apparatus for drawing and displaying an image of given objects in a three-dimensional virtual space. This apparatus comprises the following elements: (a) a movement mode manager which determining which movement mode to use, according to a given user action; (b) an eye point manager which calculates eye point coordinates and a line-of-sight vector, according to the given user action and the determined movement mode; (c) an up direction manager which sets the up direction of a projection plane to a predetermined direction when the determined movement mode is fixed up-direction mode, and determines the up direction according to predetermined rules when the determined movement mode is variable up-direction mode; (d) a drawing processor which performs a perspective transformation of the given objects onto the projection plane being oriented to the determined up direction, based on the determined eye point coordinates and line-of-sight vector, thereby creating an image of the given objects; and (e) a display processor which displays the image created by the drawing processor.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows a typical structure of a view parameter database;

DESCRIPTION OF THE PREFERRED EMBODIMENTS

Preferred embodiments of the present invention will be described below with reference to the accompanying drawings.

Figure 1:
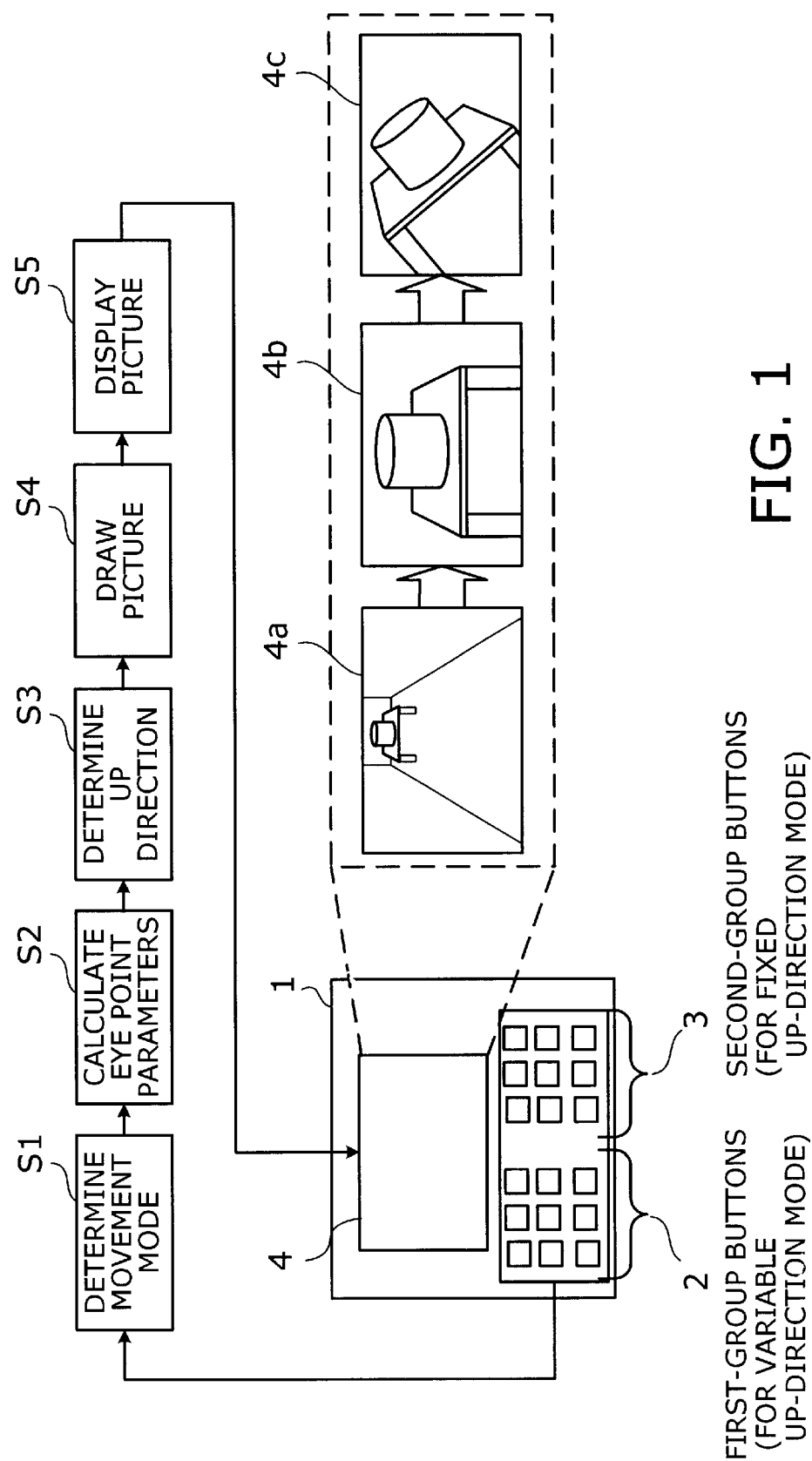
FIG. 1 is a conceptual view of the present invention.

FIG. 1 is a conceptual view of the present invention. The present invention provides a program for drawing and displaying graphical objects in a three-dimensional virtual space. The present invention also provides an object displaying apparatus which is realized by, for example, making a computer system execute the above object displaying program.

Briefly, the proposed object displaying program enables the computer system to operate as follows. First, the computer identifies which movement mode the user is requesting (step S1). The example user interface illustrated in FIG. 1 provides the following features on a computer screen 1: a video window 4 for displaying generated motion pictures, first-group buttons 2 for operations in variable up-direction mode, and second-group buttons 3 for operations in fixed up-direction mode. If any one of the first-group buttons 2 is pressed, the system recognizes it as an instruction that sets the movement mode to "variable up-direction mode." In contrast to this, if any one of the second-group buttons 3 is pressed, the system recognizes it as an instruction that sets the movement mode to "fixed up-direction mode."

Besides setting an appropriate movement mode, the above user instruction specifies how the eye point and/or the line of sight should be varied. The system parses this instruction and determines new eye point coordinates and/or line-of-sight vector, accordingly (step S2). The system further determines the up direction of the projection plane, depending on the current movement mode (step S3). More specifically, the up direction is set to a predetermined default direction in fixed up-direction mode. Typically, it is the upward direction in the three-dimensional virtual space (i.e., opposite to the gravity, assuming its presence in that virtual space). In variable up-direction mode, on the other hand, the up direction is calculated according to predetermined rules. For example, the up direction is set to a direction perpendicular to the current line-of-sight vector.

The computer then performs perspective transformation on the basis of the determined projection plane, eye point coordinates, and line-of-sight vector, thereby yielding an image of objects (step S4). The image is displayed in the video window 4 (step S5). Pictures 4a, 4b, and 4c shown in FIG. 1 are produced by repeating the above steps S1 to S5.

According to the above processing, the user's eye point movement commands implying fixed up-direction mode give a predefined orientation to the projection plane, as well as updating the eye point coordinates and line-of-sight vector as specified. The image of each object is projected on the determined projection plane, based on the updated eye point coordinates and line-of-sight vector, and the resultant pictures are presented to the user. On the other hand, a similar command implying variable up-direction mode initiates calculation of a new up direction of the projection plane, as well as updating the eye point coordinates and line-of-sight vector as specified. The image of each object is then projected on the determined projection plane, based on the updated eye point coordinates and line-of-sight vector, and the resultant pictures are presented to the user.

Suppose here that the user has pressed, for example, a move-forward button when the first example picture 4a is being displayed on the computer screen. Since this move-forward button is among the second-group buttons 3, the computer interprets this user action as a command implying fixed up-direction mode and thus sets the movement mode accordingly. The given command also makes the eye point advance forward, while keeping the current up direction of the projection plane, as well as the current direction of the line-of-sight vector. As a result, the user now has the second example picture 4b, instead of the previous picture 4a, in the video window 4.

The user then presses a rotate button, which is one of the first-group buttons 2. The computer interprets this user action as a command implying variable up-direction mode and thus sets the movement mode accordingly. The rotate command makes the projection plane rotate around the line of sight by a certain angle, while maintaining the current eye point coordinates and line-of-sight vector. The picture 4b in the video window 4 is now replaced with the third example picture 4c.

As seen from the above discussion, the present invention provides two modes to fix or vary the up direction of the projection plane when the user wishes to change his eye point position in a virtual space. Either of the two modes is selected in creating motion pictures, depending on what action the user desires. The user can thus obtain a desired picture sequence by specifying appropriate eye point changes, as needed, in a suitable movement mode which may be selected explicitly or implicitly.

In some cases, the user may wish to view a particular object from various angles. The proposed system offers variable up-direction mode which provides him/her with a higher degree of freedom in placing the eye point and changing the viewing angle. In other cases, the user would like to walk through in a building object constructed in a virtual space. The proposed system allows him/her to use fixed up-direction mode, which causes no confusion in people's perception about which is up and which is down. In this way, the present invention helps the user manipulate his/her eye point for generating motion pictures, so that he/she can freely explore in a three-dimensional virtual environment.

In three-dimensional perspective projection techniques, the upward direction of a projection plane is determined by what is called an "up vector." The next section will discuss how to define the orientation of a projection plane with this up vector.

Figure 2A:
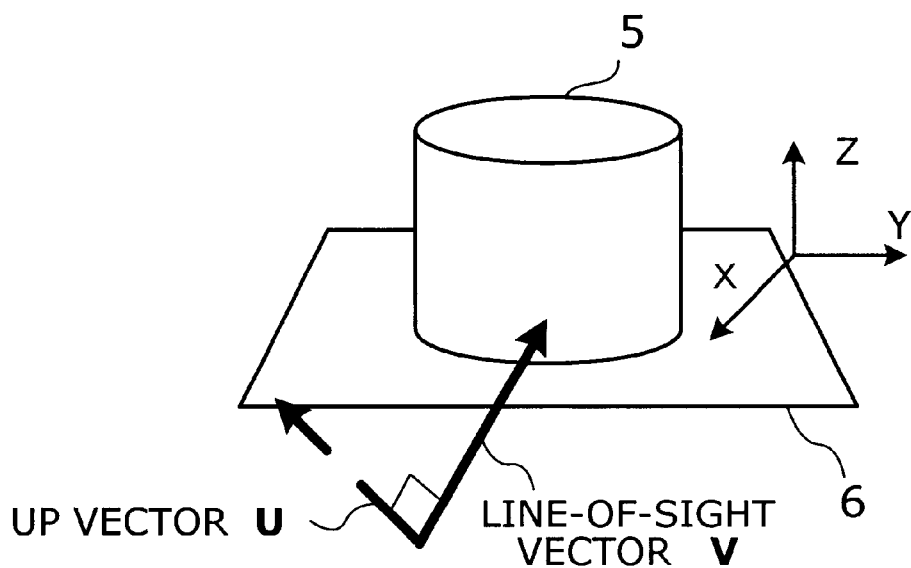
FIG. 2(A) shows an example of an up vector in variable up-direction mode.
Figure 2B:
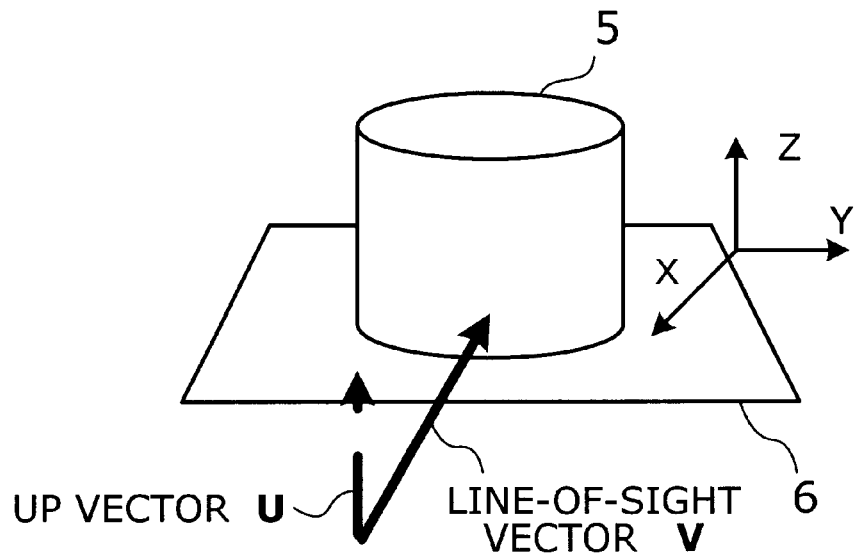
FIG. 2(B) shows an example of an up vector in fixed up-direction mode.

FIGS. 2(A) and 2(B) illustrate an up vector in each movement mode. See FIG. 2(A) for variable up-direction mode and FIG. 2(B) for fixed up-direction mode. These two examples show two objects 5 and 6 being placed in a three-dimensional virtual space, in which every point is measured in a Cartesian X-Y-Z coordinate system. The X and Y axes define a horizontal plane, and the positive Z-axis direction is supposed to be the upward direction in this environment. In variable up-direction mode, however, the up vector U is perpendicular to the line-of-sight vector V as shown in FIG. 2(A). In fixed up-direction mode, the up vector U is restricted to the upward direction (or +Z direction) of the virtual space, as shown in FIG. 2(B).

Figure 3A:
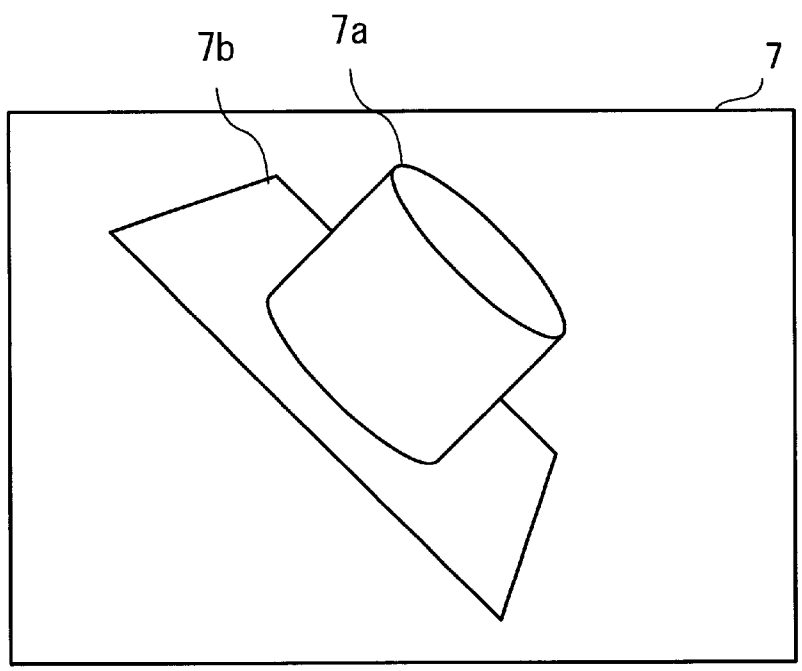
FIG. 3(A) shows an example picture in variable up-direction mode.
Figure 3B:
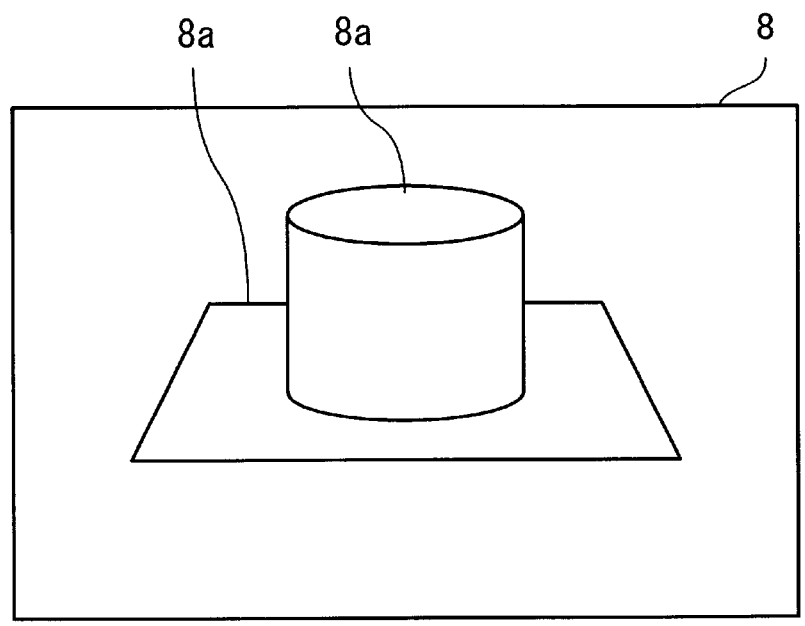
FIG. 3(B) shows an example picture in fixed up-direction mode.

Referring next to FIGS. 3(A) and 3(B), an example picture in each movement mode is presented. More specifically, FIG. 3(A) shows an example picture 7 which is obtained with the setup of FIG. 2(A) in variable up-direction mode. Shown in FIG. 3(B) is another example picture 8 which is obtained with the setup of FIG. 2(B) in fixed up-direction mode.

Recall that the objects 5 and 6 are placed horizontally, i.e., in parallel with the X-Y plane in the three-dimensional virtual space. In variable up-direction mode, however, their respective images 7a and 7b look slanted rightward as shown in the example picture 7 of FIG. 3(A). That is, every horizontal line segment defined in the three-dimensional virtual space appears as if it were titled in the projected picture 7.

In fixed up-direction mode, on the other hand, the objects 5 and 6 always appear horizontally, as shown in the picture 8 of FIG. 3(B). That is, every horizontal line segment defined in the three-dimensional virtual space is drawn in a horizontal direction when it is projected. In this way, the present invention sets the up vector U to a particular orientation that is opposite to the gravity assumed in the three-dimensional virtual space, and by doing so, it prevents the resulting images 8a and 8b of the objects 5 and 6 from being inverted or inclined.

The above functions of the present invention is implemented on a computer platform. The proposed functions are encoded in software programs which are intended for execution on a computer system. A more specific computer-based embodiment of the present invention will now be described below.

Figure 4:
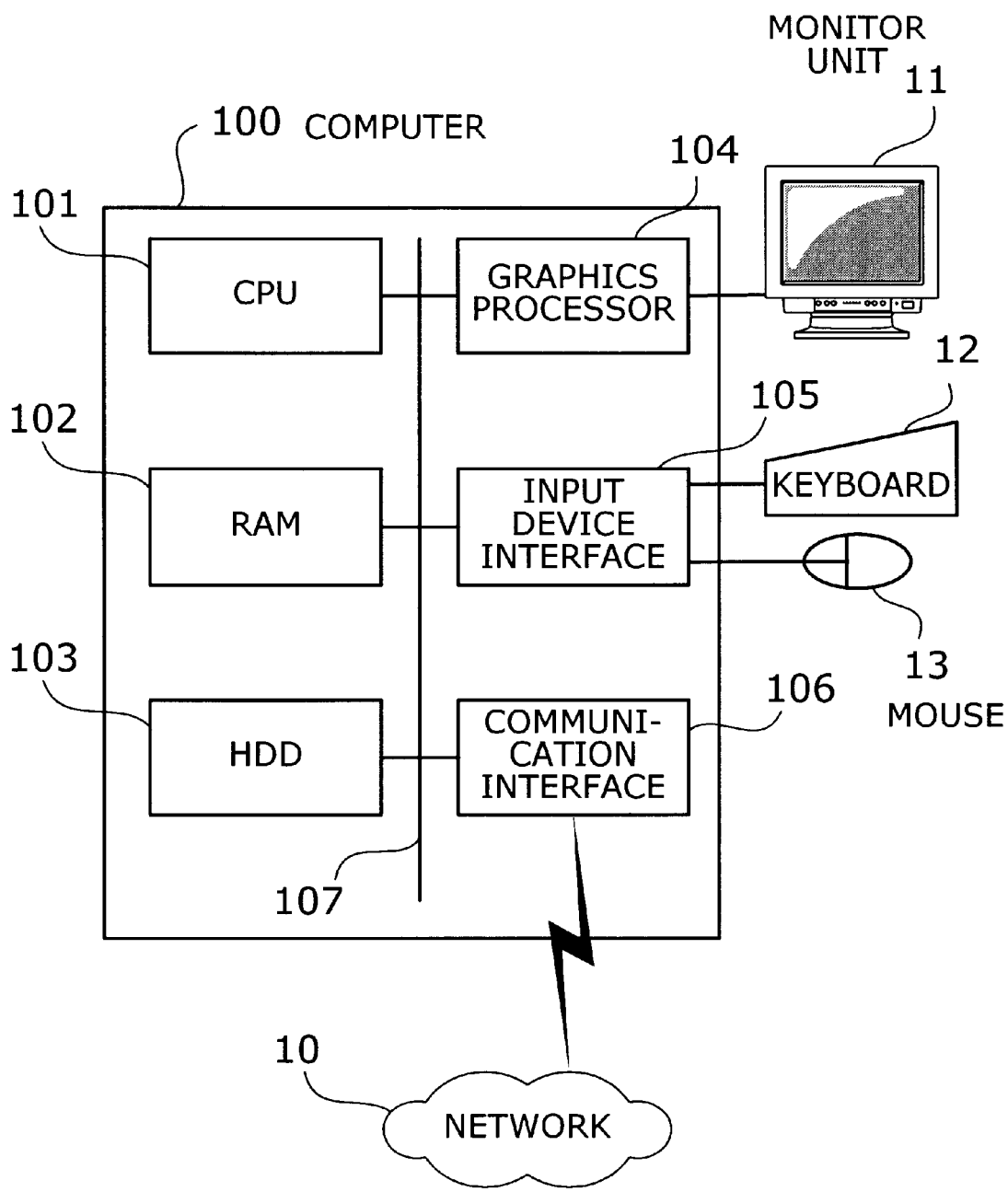
FIG. 4 shows an example of a computer platform on which the present invention is embodied.

FIG. 4 shows an example of a computer platform on which the present invention is embodied. The illustrated computer 100 comprises the following elements: a central processing unit (CPU) 101, a random access memory (RAM) 102, a hard disk drive (HDD) unit 103, a graphics processor 104, an input device interface 105, and a communication interface 106. The CPU 101 controls the computer 100 in its entirety, interacting with other elements via a common bus 107. The RAM 102 temporarily stores at least a part of the operating system (OS) and application programs that the CPU 101 executes, in addition to other various data objects manipulated at runtime. The HDD unit 103 stores program and data files of the operating system and various applications.

The graphics processor produces video images in accordance with drawing commands supplied from the CPU 101 and displays them on the screen of an external monitor unit 11 coupled thereto. The input device interface 105 is used to receive signals from external input devices such as a keyboard 12 and a mouse 13. Those input signals are passed to the CPU 101 via the bus 107. The communication interface 106 is connected to a wide area network 10, such as the Internet, allowing the CPU 101 to exchange data with other computers.

The proposed object displaying program is executed on the above-described hardware platform of the computer 100, so as to provide the intended processing steps of the present embodiment. The computer 100 now functions as an object displaying apparatus according to the present invention.

Figure 5:
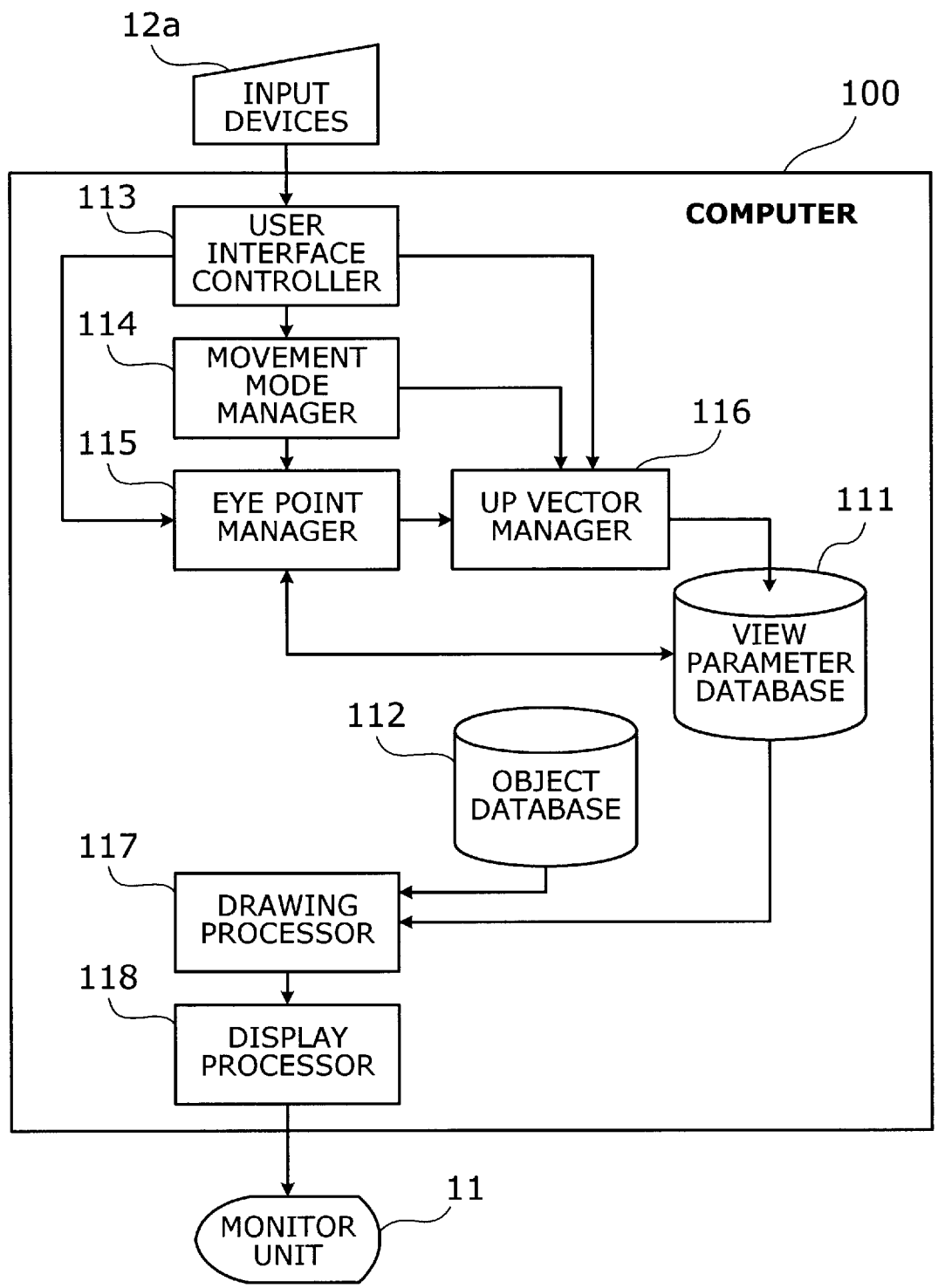
FIG. 5 is a block diagram showing a functional structure of the present invention.

FIG. 5 is a block diagram showing a functional structure of the present invention. The computer 100 creates pictures according to user commands entered through input devices 12a (e.g., keyboard 12 and mouse 13 shown in FIG. 3) and outputs them to the monitor unit 11. To this end, the computer 100 has the following functional elements: a view parameter database 111, an object database 112, a user interface controller 113, a movement mode manager 114, an eye point manager 115, an up vector manager 116, a drawing processor 117, and a display processor 118.

The view parameter database 111 stores parameters about the eye point and projection plane, which are collectively referred to herein as "view parameters." The view parameters are updated each time the user gives a relevant operation command. The object database 112 stores definitions of objects including the geometry and color specifications of each object, which are collectively referred to herein as "object data."

The user interface controller 113 produces a control command to manipulate the eye point according to the signals entered from input devices 12a. The produced control command is passed to the movement mode manager 114, eye point manager 115, and up vector manager 116. More specifically, the user interface controller 113 provides the user with a plurality of on-screen buttons for varying the eye point. Moving the cursor with the keyboard 12 or mouse 13, the user changes the focus among those buttons displayed on the monitor unit 11 and hits the enter key or clicks a mouse button to indicate a selection. The user interface controller 113 then obtains the current cursor position and identifies which button the cursor is pointing at, thus creating a control command relevant to that button. This control command is supplied to the movement mode manager 114, eye point manager 115, and up vector manager 116.

Upon receipt of the control command from the user interface controller 113, the movement mode manager 114 determines which movement mode is required to execute it. In one embodiment of the present invention, the user interface provides two groups of buttons; one is for variable up-direction mode and the other is for fixed up-direction mode. When a button is pressed by the user, the movement mode manager 114 identifies to which group that button belongs. The movement mode manager 114 determines the movement mode in this way, and passes it to the eye point manager 115 and up vector manager 116.

The eye point manager 115 determines appropriate eye point parameters (including eye point coordinates and line-of-sight vector), depending on the control command from the user interface controller 113, as well as on the movement mode information sent from the movement mode manager 114. The eye point manager 115 informs the up vector manager 116 of the updated line-of-sight vector, besides storing the determined eye point parameters in the view parameter database 111.

The up vector manager 116 has now received the control command from the user interface controller 113, the movement mode from the movement mode manager 114, the line-of-sight vector from the eye point manager 115. Based on those pieces of information, the up vector manager 116 calculates a new up vector. More specifically, when the variable up-direction mode is specified as the movement mode, the up vector will be updated according to the given control command, while maintaining its current angle of 90 degrees with respect to the line-of-sight vector. When the vertically-fixed mode is specified, it gives a fixed up vector (0, 0, 1) pointing at the +Z direction (i.e., default upward direction) of the three-dimensional virtual space, regardless of the line-of-sight vector or the control command content. The up vector determined in this way is entered to the view parameter database 111.

The drawing processor 117 performs perspective projection of three-dimensional models and objects on the projection plane, based on the parameters read out of the view parameter database 111 and object database 112. The projection routine is repetitively executed at a predetermined frame rate (e.g., 60 frames per second) resulting in a series of perspective views, or continuous motion pictures. The display processor 118 sends each produced perspective view to the monitor unit 11, converting it into video signals.

FIG. 6 shows a typical structure of the view parameter database 111. The view parameter database 111 stores the following information: eye point coordinates E, line-of-sight vector V, up vector U, projection plane's distance D, projection plane's normal vector Sn, and window size.

Eye point coordinates E, represented in the form of XYZ coordinates (Ex, Ey, Ez), indicate where in the given three-dimensional virtual space the eye point is currently set. The coordinate values are updated according to each relevant operation command from the user.

Line-of-sight vector V is a unit vector representing to which direction the eye is directed. The three-dimensional components (Vx, Vy, Vz) of this vector are changed according to a relevant operation command from the user. Up vector U is a unit vector indicating a predetermined upward direction (Ux, Uy, Uz) of the view. According to the present invention, the up vector U is updated by the up vector manager 116, as necessary.

The projection plane distance parameter D is previously defined as the distance from the eye point E to a predetermined reference point (e.g., the center) of the projection plane. Normal vector Sn of the projection plane indicates the direction perpendicular to the projection plane (Sx, Sy, Sz). Typically, the normal vector Sn is parallel with the line-of-sight vector V and other related parameters. It is also possible to restrict the normal vector Sn within a horizontal plane. Lastly, the window size parameters (Wx, Wy) give the size of the projection plane, which has previously been defined.

Figure 7:
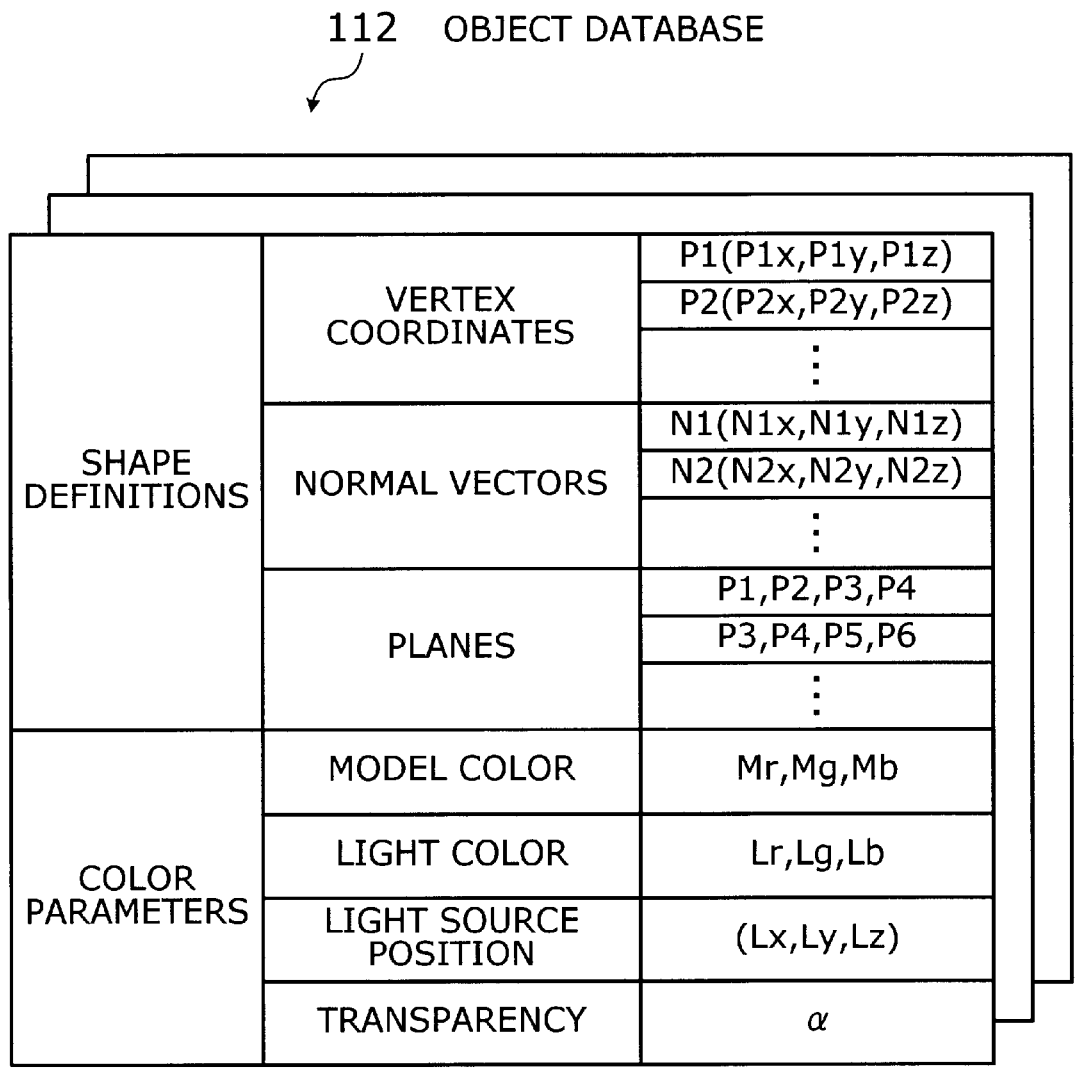
FIG. 7 shows a typical structure of records in an object database.

FIG. 7 shows a typical structure of records stored in the object database 112. This object database 112 stores records describing individual objects, each record containing shape definitions and color parameters.

The shape definitions section of a database record contains the following parameters to describe the shape of an object: (a) vertex coordinates, (b) normal vectors, and (c) planes. More specifically, the vertex coordinates refer to the coordinates (Pix, Piy, Piz) of each vertex Pi of the object in the three-dimensional virtual space, where Pi is the identifier of the i-th vertex (i=1 and 2, . . .). As FIG. 7 shows, the object database 112 stores coordinate values together with their associated vertex identifiers P1, P2, and so on.

The normal vectors (Nix, Niy, Niz) indicate the normal direction of each vertex Pi. The object database 112 stores each normal vector together with its identifier Ni (i=1, 2, . . .) which are associated with the individual vertexes Pi.

Each plane of an object is defined as a set of vertexes. The object database 112 stores a plurality of planes, each of which is identified by a particular combination of vertex identifiers. For example, a rectangular plane is defined by four vertexes; a triangular plane is defined by three vertexes.

The color parameters section contains the following information: model color, light color, light source position, and transparency factor. The model color refers to the color of an object, which is expressed in the brightness (Mr, Mg, Mb) of three primary colors (red, green, blue). While the example of FIG. 7 shows only one model color, it is possible to specify the color of each individual plane.

The light color refers to the color of a light emanating from a given light source, which is represented as the brightness (Lr, Lg, Lb) of three primary colors (red, green, blue). The light source position (Lx, Ly, Lz) refers to the coordinates of the light source in the three-dimensional virtual space.

The transparency parameter α gives the transparency of the object of interest when it is drawn over background images. This parameter a lies in the ranges of zero to one ($0 \leq \alpha \leq 1$), where α=0 means that the object is perfectly opaque, while α=1 means that it is completely transparent (i.e., invisible). The larger the factor α is, the more transparent the object becomes.

Figure 8:
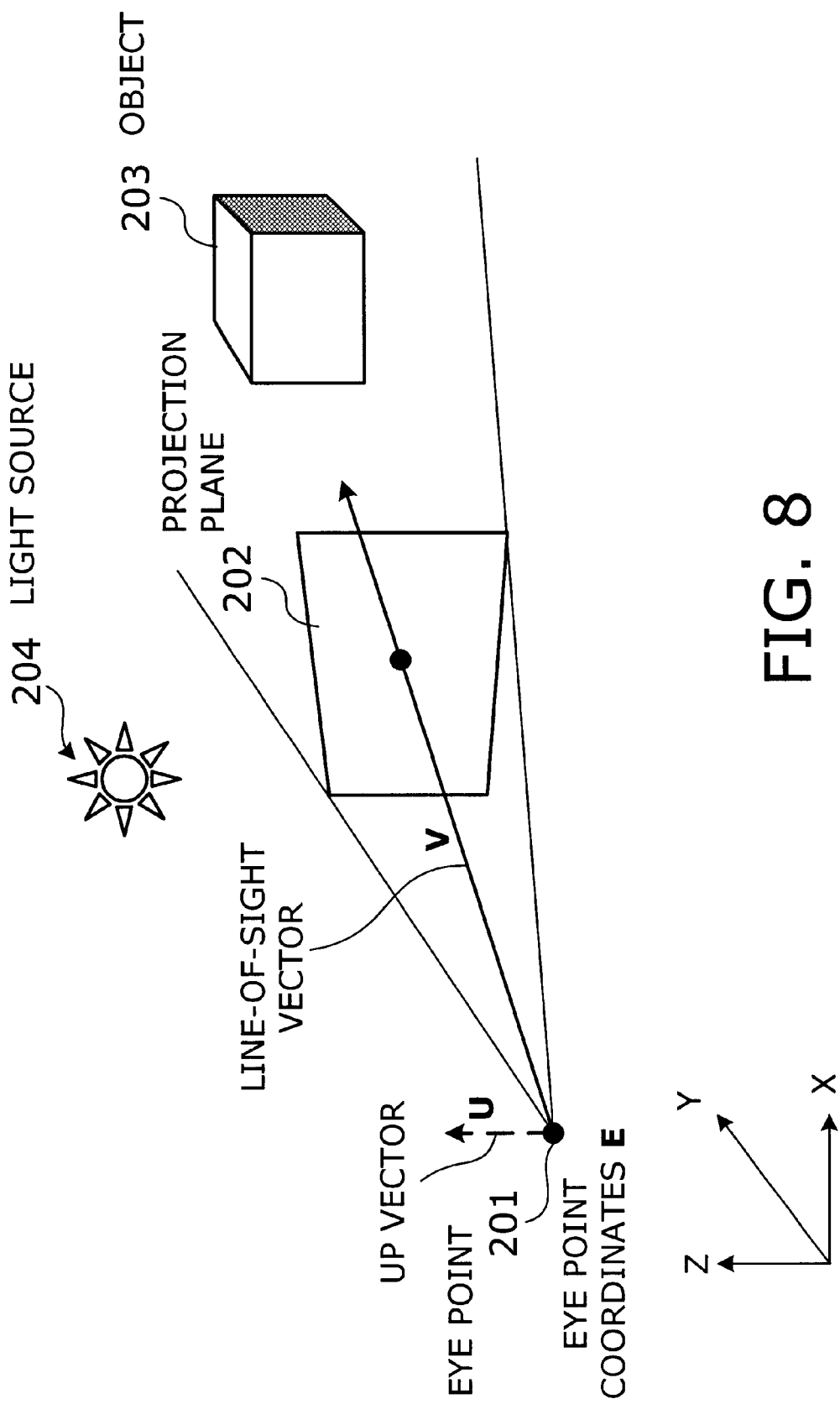
FIG. 8 schematically shows the concept of three-dimensional perspective projection.

Under the conditions determined by the parameters explained in FIGS. 6 and 7, the drawing processor 117 performs perspective projection for a particular scene. FIG. 8 schematically shows the concept of three-dimensional perspective projection. Arranged in the illustrated three-dimensional virtual space are: an eye point 201, a projection plane 202, an object 203, and a light source 204. The definition of the eye point 201 includes eye point coordinates E and a line-of-sight vector V. The projection plane 202 is characterized by its normal vector and other parameters. The object 203 has its own model color, transparency factor α, vertex coordinates, normal vectors, and other properties. The light source 204 is characterized by the parameters such as a light source position and light color components.

Figure 9:
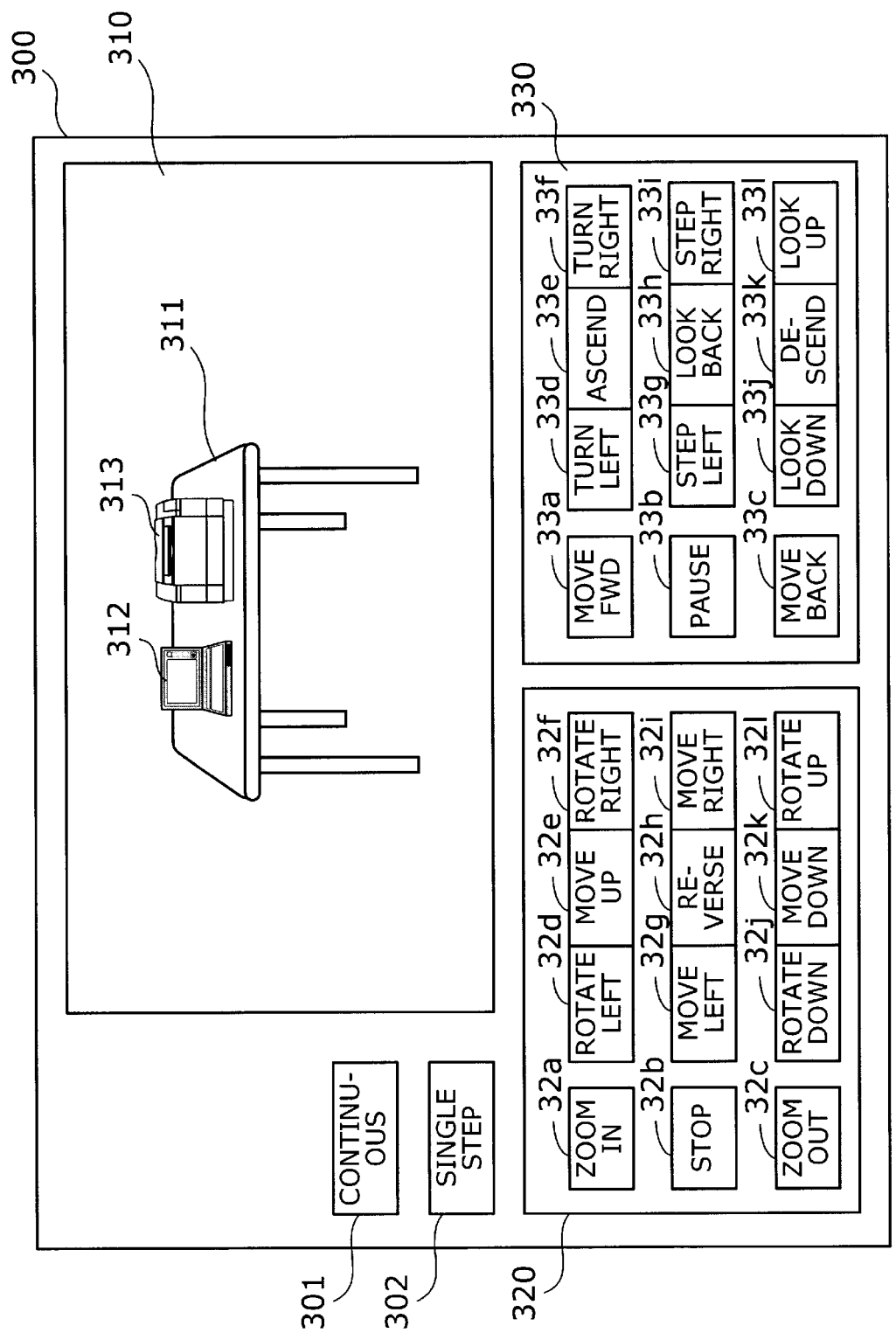
FIG. 9 shows an example screenshot which is produced by the present embodiment.

The above-described arrangement enables the object displaying tasks of the present invention to be executed in response to a user action. According to the present embodiment, the user is allowed to command the system to move the eye point by selecting appropriate buttons available on the screen of the monitor unit 11. FIG. 9 shows an example screen which is produced by the object displaying program in the present embodiment. The user can move his/her eye point in a three-dimensional virtual space by designating a specific direction with respect to his/her current line of sight in that space. In other words, every eye point movement command (e.g., move to the left or right) is to be specified with reference to the current direction of the line-of-sight vector. The following discussion assumes this aspect of eye point movement commands.

Referring to FIG. 9, the illustrated monitor screen 300 is constructed with the following elements: command mode changing buttons 301 and 302, a video display window 310, first-group buttons 320 for flexible up-direction mode, and second-group buttons 330 for fixed up-direction mode.

The first command mode changing button 301 makes a specified movement command to be repeated. When the button 301 is pressed, the system sets its command execution mode to "continuous operation mode." In this mode, a click on a certain movement command button will initiate continuous movement of the eye point in the specified direction until it is intentionally interrupted by a depression of "Pause" or "Stop" button.

In contrast to the above, the second command mode changing button 302 lets the system to interpret each eye point movement request as a one-shot command. When this button 302 is pressed, the system sets its command execution mode to "single step operation mode." In single step operation mode, a click on a certain movement command button will initiate an eye point movement with a predetermined amount. In other words, the eye point will stop at a new position after the specified movement is done.

The video display window 310 shows motion pictures created by repeating perspective projection of objects in the three-dimensional virtual space at predetermined intervals.

In the example screenshot of FIG. 9, the video display window 310 contains the images of a table object 311, a computer object 312, and a printer object 313.

The first-group buttons 320 serve as part of the user interface, permitting the user to move the eye point in variable up-direction mode. This button group includes a plurality of individual buttons 32a to 321 for variable up-direction mode, each function of which will be described below.

The "Zoom In" button 32a is used to zoom into an object. When this button 32a is selected, the eye point 201 moves toward a specific object pointed at by the line-of-sight vector V, thus expanding the image of that object gradually in the video display window 310.

The "Stop" button 32b is used to interrupt on-going movement of the eye point and line-of-sight vector which has been initiated in continuous operation mode. The eye point 201 and line-of-sight vector V stop moving when this button 32b is pressed.

The "Zoom Out" button 32c is used to zoom out of an object. When this button 32c is selected, the eye point 201 moves away from a specific object pointed at by the line-of-sight vector V, thus shrinking the image of that object gradually in the video display window 310.

The "Rotate Left" button 32d is used to turn the eye point around an object of interest to the left-hand direction. When this button 32d is pressed, the eye point 201 will move around a particular object of interest (which is specified by the user) to the left-hand direction, along a circular arc with its center at that object. In the course of that movement, the line-of-sight vector V is updated in such a way that it will always point at the object of interest.

The "Move Up" button 32e is used to move the image of an object of interest to the upward direction within the video display window 310. When this button 32e is pressed, the eye point 201 will move in the opposite direction to the up vector U.

The "Rotate Right" button 32f is used to turn the eye point around an object of the current interest to the right-hand direction. When this button 32f is pressed, the eye point 201 will move to the right-hand direction around a specific object of interest, along a circular arc with its center at that object. During that movement, the line-of-sight vector V is updated in such a way that it will always point at the object of interest.

The "Move Left" button 32g is used to move the image of an object of interest to the left direction within the video display window 310. When this button 32g is pressed, the eye point 201 will move to the right, perpendicularly to the plane formed by the line-of-sight vector V and up vector U.

The "Reverse" button 32h is used to reverse the line-of-sight vector V. When this button 32h is pressed, the line-of-sight vector V is turned to the opposite direction, while maintaining the up vector U as it is.

The "Move Right" button 32i is used to move the image of an object of interest to the right direction within the video display window 310. When this button 32i is pressed, the eye point 201 will move to the left, perpendicularly to the plane formed by the line-of-sight vector V and up vector U.

The "Rotate Down" button 32j is used to turn the eye point 201 around an object of interest to the downward direction. When this button 32j is pressed, the eye point 201 will move downward with respect to a specific object of interest. In the course of that movement, the line-of-sight vector V is updated in such a way that it will always point at the object of interest.

The "Move Down" button 32k is used to move the image of an object of interest to the downward direction within the video display window 310. When this button 32k is pressed, the eye point 201 will move in the direction of the up vector U.

The "Rotate Up" button 321 is used to turn the eye point 201 around an object of interest to the upward direction. When this button 321 is pressed, the eye point 201 will move upward with respect to a specific object of interest. In the course of that movement, the line-of-sight vector V is updated in such a way that it will always point at the object of interest.

The second-group buttons 330 function as another part of the user interface, permitting the user to move the eye point in fixed up-direction mode. This button group includes a plurality of individual buttons 33a to 33l for fixed up-direction mode, each function of which will be described below.

The "Move On" button 33a is used to advance the eye point forward. When this button 33a is pressed, the eye point starts moving toward the direction represented by the horizontal component of the line-of-sight vector V.

The "Pause" button 33b is used to interrupt the current eye point movement which was initiated by a movement command, such as "Move On" or "Move Back" in continuous operation mode. When this button 33b is pressed, the eye point 201 stops its movement.

The "Move Back" button 33c is used to retreat the eye point position. When this button 33c is pressed, the eye point starts moving away in the opposite direction to the horizontal component of the current line-of-sight vector V.

The "Turn Left" button 33d is used to swing the line-of-sight vector V to the left-hand side of the screen. When this button 33d is pressed, the system turns the line-of-sight vector V to the left direction around the current eye point (which is unchanged).

The "Ascend" button 33e is used to elevate the eye point. When this button 33e is pressed, the system raises the eye point in the vertical direction, while maintaining the current line-of-sight vector V as it is.

The "Turn Right" button 33f is used to swing the line-of-sight vector V to the right-hand side of the screen. When this button 33f is pressed, the system turns the line-of-sight vector V to the right direction around the current eye point (which is unchanged).

The "Step Left" button 33g is used to move the eye point to the left direction. When this button 33g is pressed, the system shifts the eye point to the left direction horizontally and perpendicularly to the current line-of-sight vector V (which is unchanged).

The "Look Back" button 33h is used to reverse the line of sight. When this button 33h is pressed, the system changes the sign of X- and Y-axis components of the line-of-sight vector V, while maintaining its Z-axis component.

The "Step Right" button 33i is used to move the eye point to the right direction. When this button 33i is pressed, the system shifts the eye point to the right direction horizontally and perpendicularly to the current line-of-sight vector V (which is unchanged).

The "Look Down" button 33j is used to move the focus to a lower part of the current view field. When this button 33j is pressed, the system turns the line-of-sight vector V downward (i.e., to the -Z direction).

The "Descend" button 33k is used to move the eye point to a lower level. When this button 33k is pressed, the system moves down the eye point in the vertical direction, without changing the current line-of-sight vector V.

The "Look Up" button 33l is used to move the focus to an upper part of the current view field. When this button 33l is pressed, the system turns the line-of-sight vector V upward (i.e., to the +Z direction).

The above section has described the functions of various movement command buttons available to the user. The next section will now present some examples of movement command operations in each of the variable up-direction mode and fixed up-direction mode.

Figure 10A:
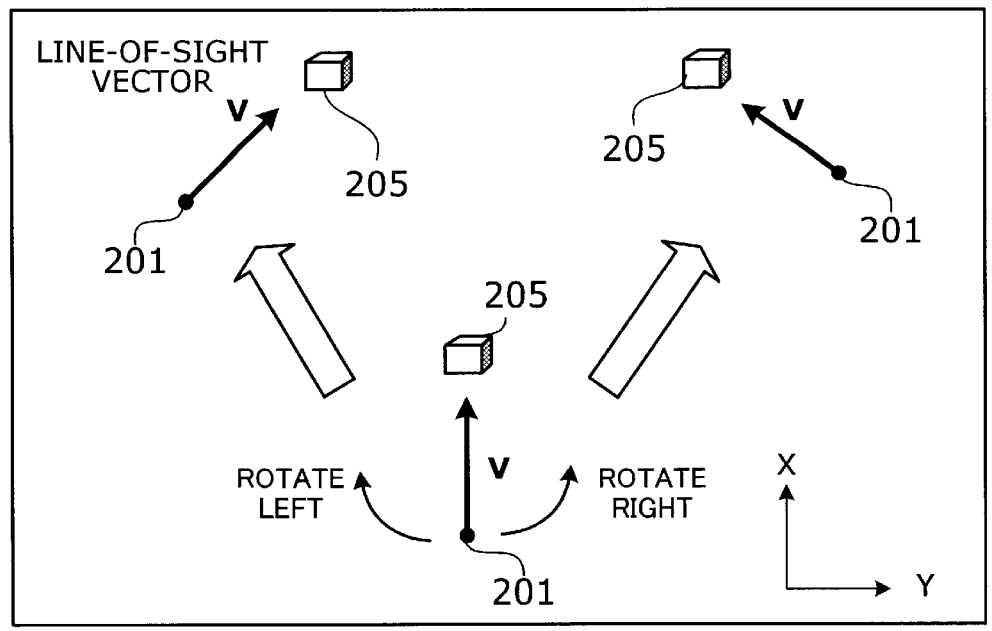
FIG. 10(A) shows a rotate-left and rotate-right operations in variable up-direction mode.
Figure 10B:
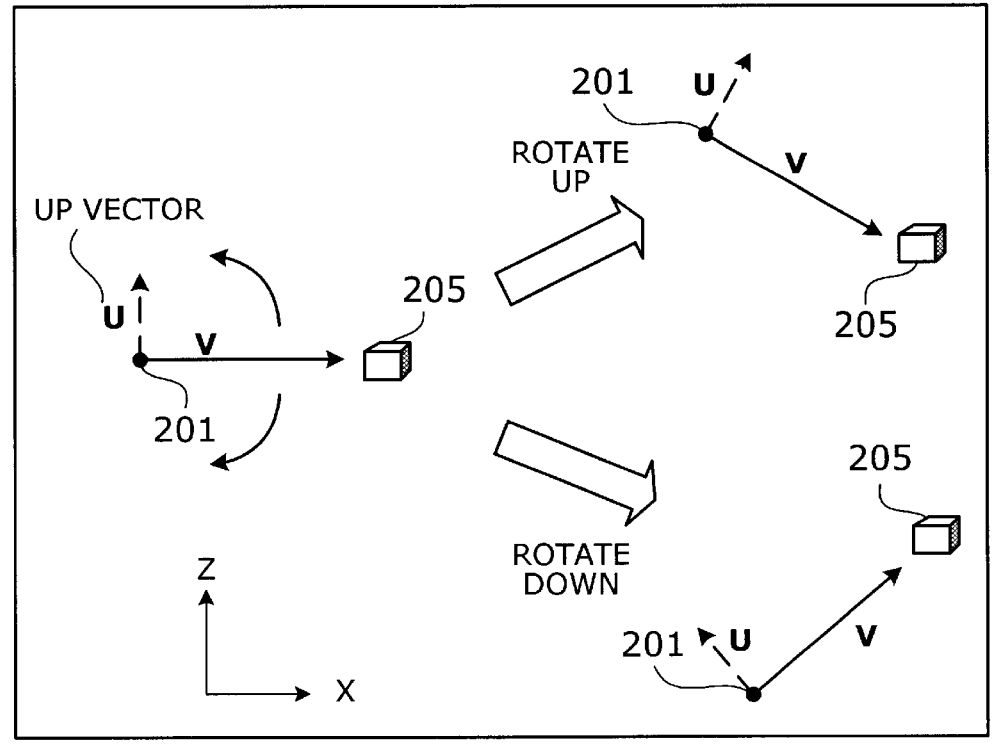
FIG. 10(B) shows a rotate-up and rotate-down operations in variable up-direction mode.

FIGS. 10(A) and 10(B) show example movements in variable up-direction mode. More specifically, FIG. 10(A) illustrates the above-described rotate-left and rotate-right operations in variable up-direction mode, while FIG. 10(B) shows the above-described rotate-up and rotate-down operations in the same mode.

Referring first to FIG. 10(A), it is assumed that the line-of-sight vector V points to the +X direction and the up vector U to the +Z direction. Here, the Z axis runs from the back side to the front side of the drawing sheet. Suppose that the user presses the "Rotate Left" button 32d. This action causes the eye point 201 to move around an object 205 of interest to the left-hand direction in variable up-direction mode. Note that the line-of-sight vector V is updated together with the eye point movement, so that it will always point at the object 205 of interest. That is, the line-of-sight vector V rotates clockwise on a plane that contains the line-of-sight vector V and is perpendicular to the up vector U (which is the X-Y plane in this example).

Similarly to the above, when the user presses the "Rotate Right" button 32f, this action causes the eye point 201 to move around the object 205 of interest to the right-hand direction in variable up-direction mode. Here, the line-of-sight vector V is controlled in such a way that it will always point at the object 205 of interest. That is, the line-of-sight vector V rotates counter-clockwise on a plane that contains the line-of-sight vector V and is perpendicular to the up vector U (which is the X-Y plane in this example).

Referring next to FIG. 10(B), it is assumed that the line-of-sight vector V points to the +X direction and the up vector U to the +Z direction. Unlike FIG. 10(A), the Z axis runs in a bottom-to-top direction on the drawing sheet of FIG. 10(B).

Suppose that the user has pressed the "Rotate Down" button 32j. This action causes the eye point 201 to move around the object 205 of interest to the downward direction in variable up-direction mode. The line-of-sight vector V always points at the object 205 of interest. That is, the line-of-sight vector V and up vector rotate together in the counter-clockwise direction on a plane that contains both of them (which is the X-Z plane in the present example).

When the user presses in turn the "Rotate Up" button 321 in variable up-direction mode, the eye point 201 moves around the object 205 to the upward direction. Again, the line-of-sight vector V always points at the object 205 of interest. This means that the line-of-sight vector V and up vector rotate together in the clockwise direction on a plane that contains both of them (which is the X-Z plane in the present example).

Figure 11A:
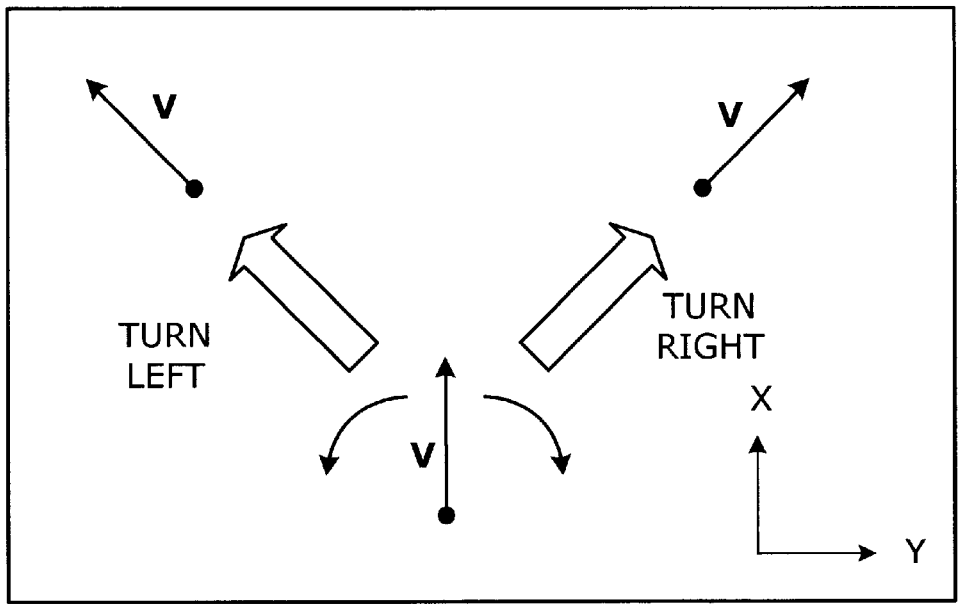
FIG. 11(A) shows a turn-left and turn-right operations in fixed up-direction mode.
Figure 11B:
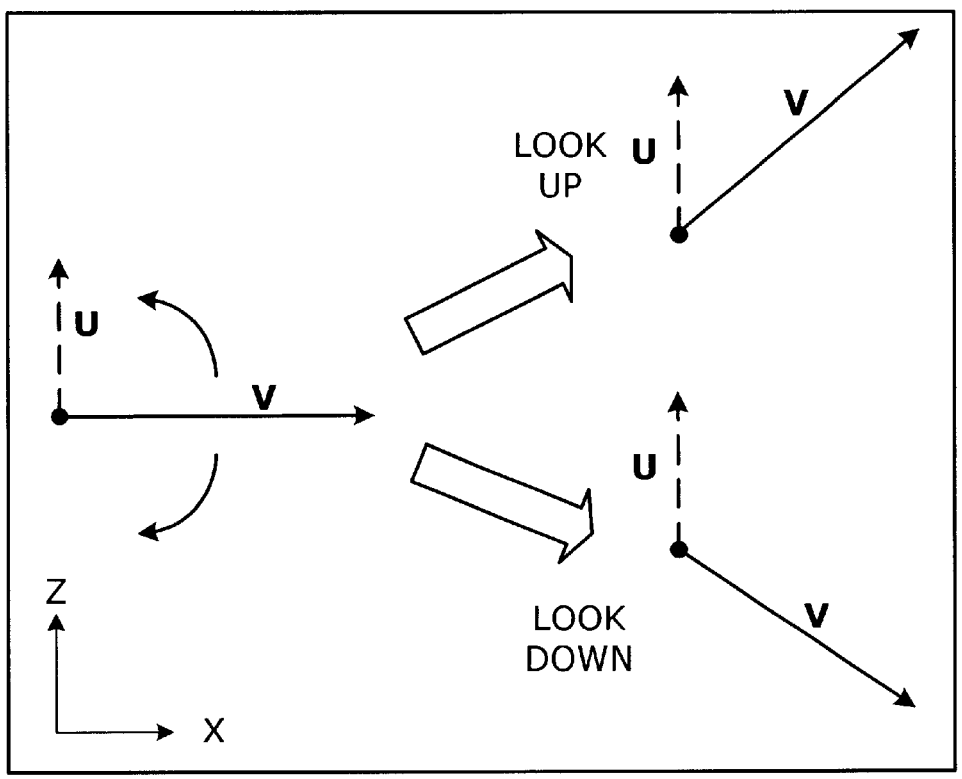
FIG. 11(B) shows a look-up and look-down in fixed up-direction mode.

FIGS. 11(A) and 11(B) show examples of eye point movements in fixed up-direction mode. More specifically, FIG. 11(A) illustrates a turn-left and turn-right operations in fixed up-direction mode, while FIG. 11(B) shows a look-up and look-down operations in the same mode.

Referring to FIG. 11(A), it is assumed that the line-of-sight vector V points to the +X direction and the up vector U to the +Z direction. Consider that the Z axis runs from the back side to the front side of the drawing sheet. If the "Turn Left" button 33d is pressed, then the system turns the line-of-sight vector V in a counterclockwise direction on a horizontal (X-Y) plane in fixed up-direction mode. Likewise, if the "Turn Right" button 33f is pressed, then the system turns the line-of-sight vector V in a clockwise direction on the same plane.

Referring next to FIG. 11(B), it is assumed that the line-of-sight vector V points to the +X direction and the up vector U to the +Z direction. Unlike FIG. 11(A), the Z axis runs from the bottom to the top of the drawing. Suppose here that the "Look Down" button 33j for fixed up-direction mode is pressed. Then the system turns the line-of-sight vector V in a clockwise direction on an X-Z plane which contains both the up vector U and line-of-sight vector V. Likewise, if the "Look Up" button 33l (fixed up-direction mode) is pressed, then the system turns the line-of-sight vector V in a counterclockwise direction on the same X-Z plane.

As described above, the up vector U is affected by user actions in variable up-direction mode. This does not happen in fixed up-direction mode; the up vector U is fixed to the +Z direction. The user interface provides first-group buttons 320 (32a to 32l) for flexible up-direction mode 320 and second-group buttons 330 (33a to 33l) for fixed up-direction mode. In attempt to obtain a desired motion picture, the user selects an appropriate group, depending on his/her requirements.

Figure 12:
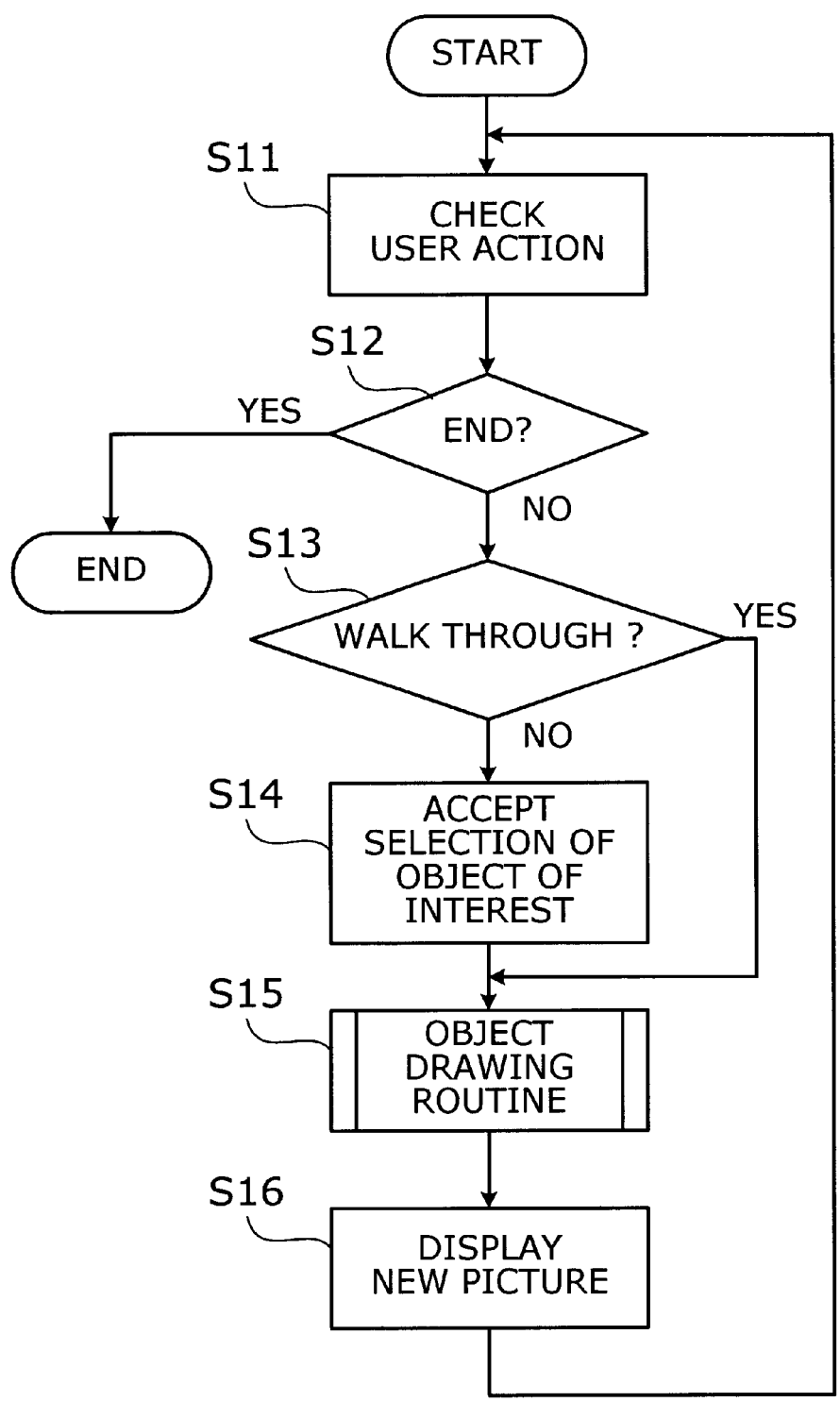
FIG. 12 shows the main flow of an object drawing and displaying process.

To achieve the above-described functions, the computer 100 of FIG. 5 executes necessary processing steps when a command button is pressed. FIG. 12 shows the main flow of an object drawing and displaying process, which takes the following steps.

(S11) The user interface controller 113 receives a user input through the input devices 12a.

(S12) The user interface controller 113 determines whether the user action is a request for termination of the current processing. If so, the process is terminated. If not, the process is advanced to step S13.

(S13) The movement mode manager 114 determines whether the user is requesting a walk-through command in fixed up-direction mode. More specifically, this test is achieved by identifying which group of buttons was selected by the user. If it is one of the first-group buttons 320 (32a to 32l), the movement mode manager 114 determines that the user does not intend a walk-through action, and then advances the process to step S14. If it is one of the second-group buttons 330 (33a to 33l), the movement mode manager 114 interprets that user action as a walk-through command, and thus advances the process to step S15.

(S14) The user interface controller 113 expects an object selection to be made by the user. That is, the user selects a particular object of interest and indicates it to the user interface controller 113.

(S15) An object drawing routine is executed through collaboration among the eye point manager 115, up vector manager 116, and drawing processor 117. The details of this routine will be discussed later.

(S16) Now that a new picture has been created, the display processor 118 outputs it on the screen of the monitor unit 11. The process then returns to step S11, the top of the flowchart.

Figure 13:
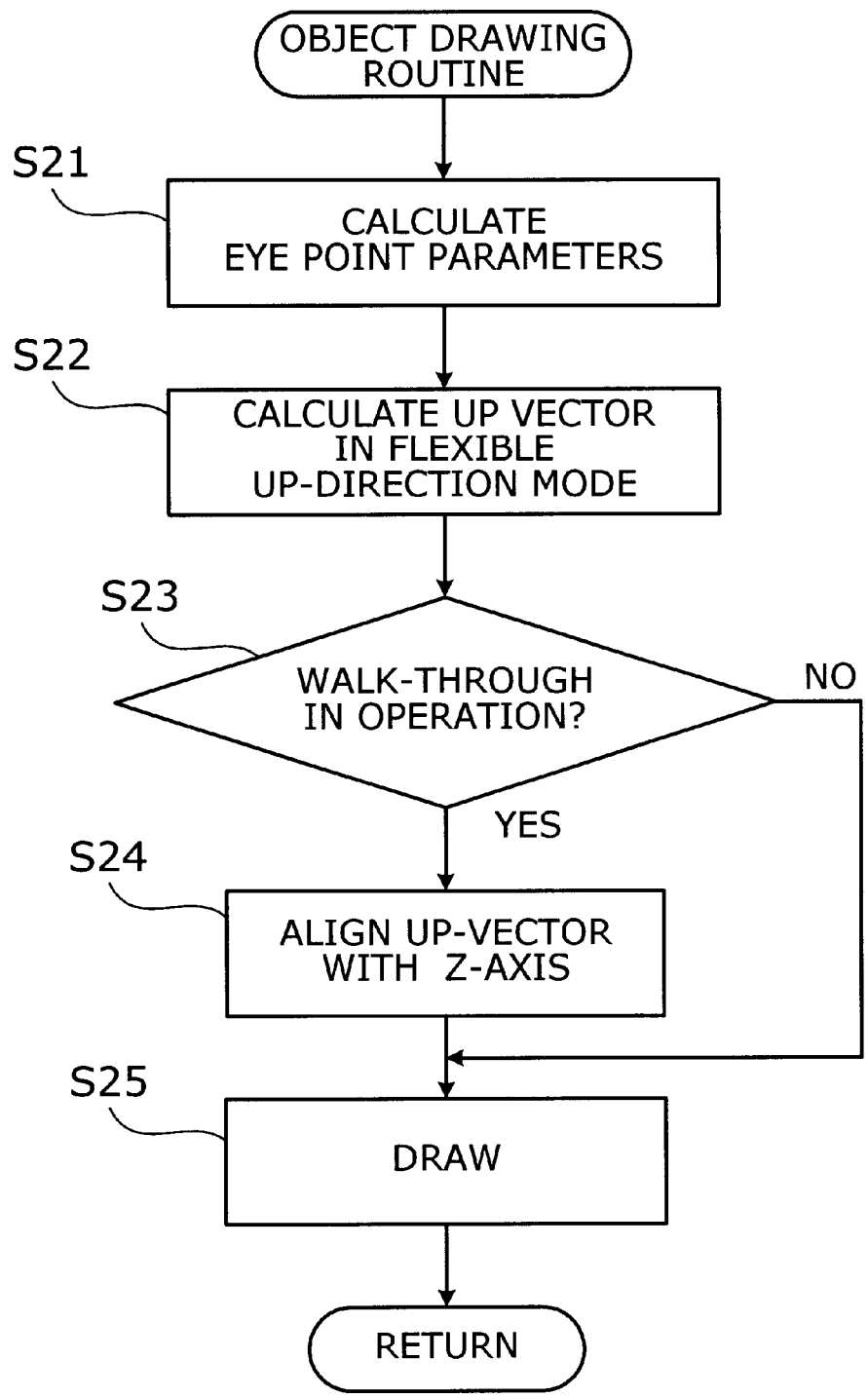
FIG. 13 is a flowchart which shows the details of the object drawing routine.

FIG. 13 is a flowchart which shows the details of the object drawing routine mentioned above. This routine comprises the following steps.

(S21) The eye point manager 115 calculates eye point parameters according to the given user action. The eye point coordinates E and line-of-sight vector V are updated in this step.

(S22) The up vector manager 116 calculates the up vector U for variable up-direction mode. It saves the new up vector U in the view parameter database 111.

(S23) The up vector manager 116 determines whether a walk-through command is in process. If so, the process advances to step S24. If not, the process skips to step S25.

(S24) The up vector manager 116 updates the up vector U stored in the view parameter database 111 by setting it to (0, 0, 1). This means that the up vector U is changed to the +Z direction.

(S25) Using the parameters read out of the view parameter database 111 and object database 112, the drawing processor 117 performs perspective projection of objects in the three-dimensional virtual space. The resulting object image on the projection plane is passed to the calling process, i.e., step S16 in FIG. 12.

Figure 14:
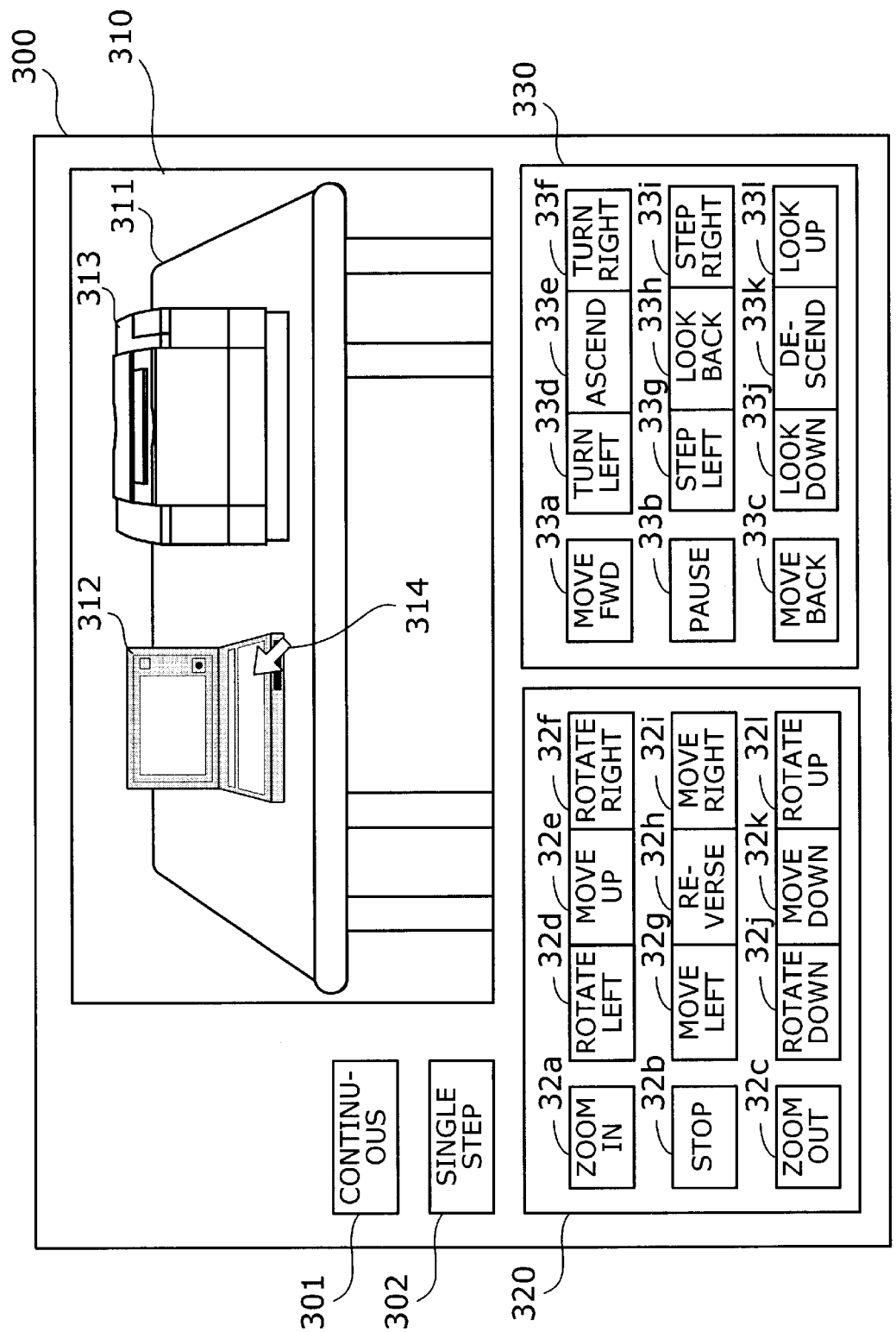
FIG. 14 shows an example screenshot when a move-forward command has been executed, with respect to the state shown in FIG. 9.

Depending on which commands the user gives, the resulting motion picture varies. Recall the monitor screen 300 of FIG. 9, where a table object 311 is shown together with other objects 312 and 313, and consider, for example, that the user attempts to approach the table object 311. To achieve this, the user initiates a walk-through command by pressing the "Move Fwd" button 33a with the mouse 13. The resultant picture is shown in FIG. 14. As seen from this picture, the move-forward operation has resulted in enlarged object images 311 to 313 in the video display window 310, compared to those in FIG. 9.

Figure 15:
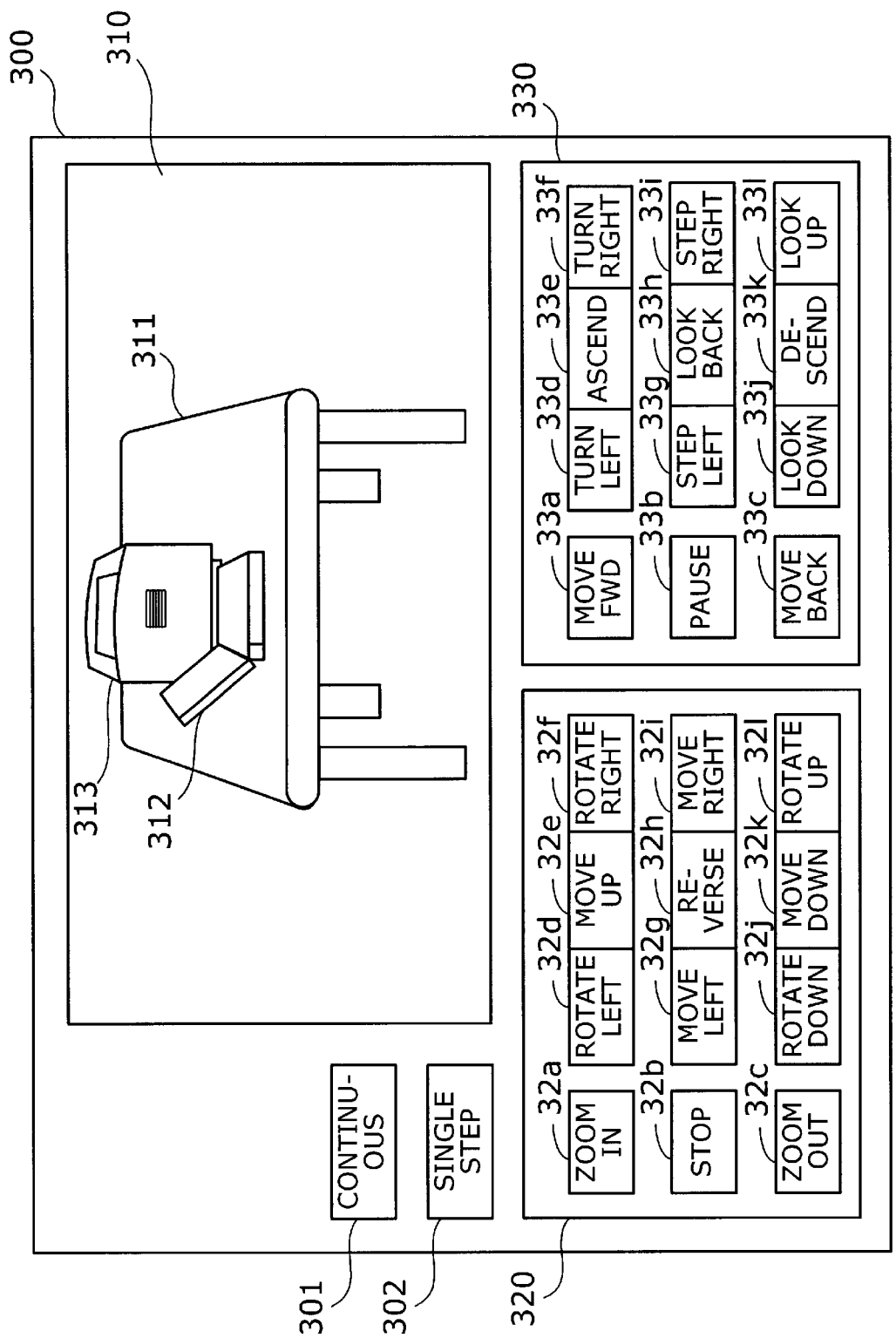
FIG. 15 shows an example screenshot when a rotate-left command has been executed, with respect to the state shown in FIG. 14.

The user may then wish to get a left-side view of the computer object 312. Such a view will be obtained by pressing the "Rotate Left" button 32d (variable up-direction mode) and clicking the object 312 with the mouse cursor 314. Now that the object 312 is selected as the object of interest, the system subjects it to a rotate-left operation, generating a new picture shown in FIG. 15. As seen from this picture, the depression of the "Rotate Left" button 32d has caused a movement of the eye point 201 along a circular arc around the object 312 of interest. The eye point is now placed at a new location from which the left-side surfaces of the object 312 can be observed, the line-of-sight vector V being directed to the object 312. As a result, the user can view the left-side surfaces of the object 312 in the new picture in the video display window 310.

In the way described above, the user can select appropriate mode of operation (variable up-direction mode or fixed up-direction mode) that is suitable for obtaining a desired eye point and preferred line of sight within a given three-dimensional virtual space. Furthermore, the variable up-direction mode allows him/her to move the eye point and line-of-sight vector relative to a particular object of interest specified by himself/herself. With this feature, the user can view a desired object from various directions with a simple operation.

According to the present embodiment, the up vector U will be forced to have a direction opposite to the gravity when a walk-through command is issued in the midst of movement in variable up-direction mode, because walk-through commands require fixed up-direction mode. While the user may sometimes be confused by inclination of the up vector U when exploring in a three-dimensional virtual space, the present invention permits him/her to regain the sense of vertical directions by making a command in fixed up-direction mode. With this simple operation, the picture frame on the monitor screen will be aligned with the virtual space's inherent vertical axis.

Figure 16:
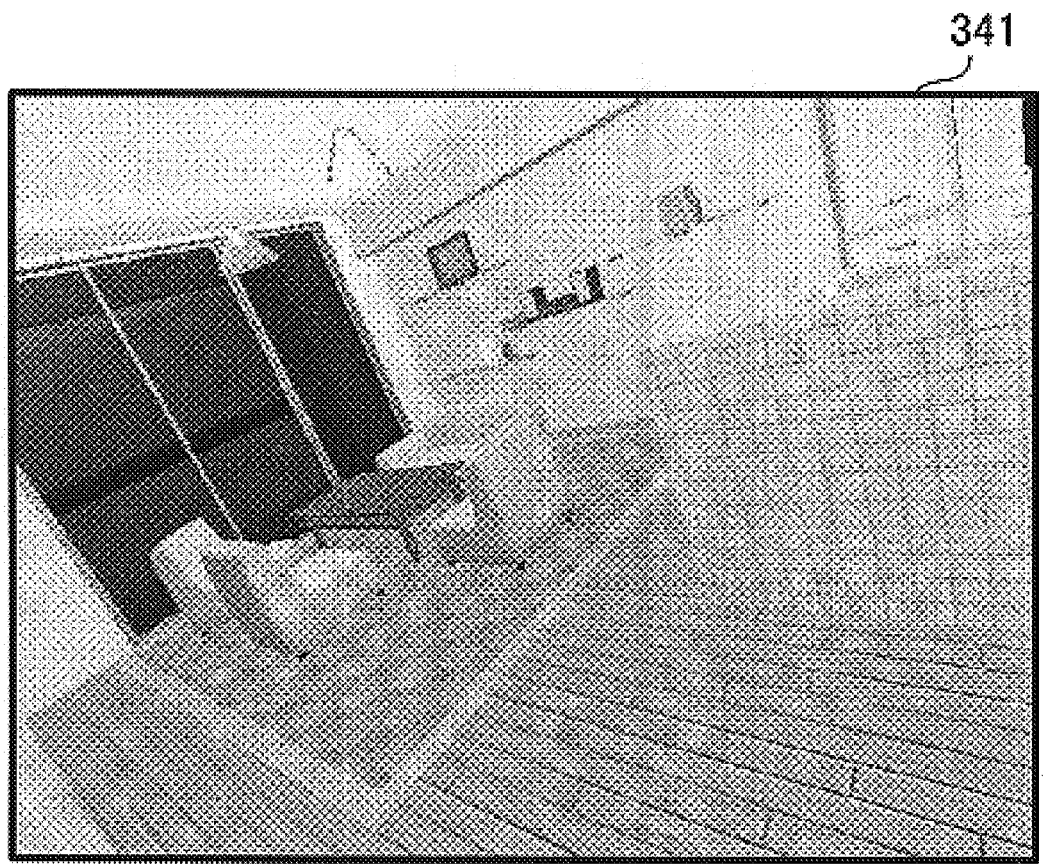
FIG. 16 shows an example of a picture produced with an inclined up vector.

FIG. 16 shows an example of a picture produced with an inclined up vector. This example picture 341 is a three-dimensional representation of the interior of a room that is located in a three-dimensional virtual space. Because the up vector U is not aligned with the vertical axis (Z axis) of the virtual space, every object, such as a chair, in the resulting picture 341 looks as if it were inclined with respect to the vertical lines of the picture frame.

Figure 17:
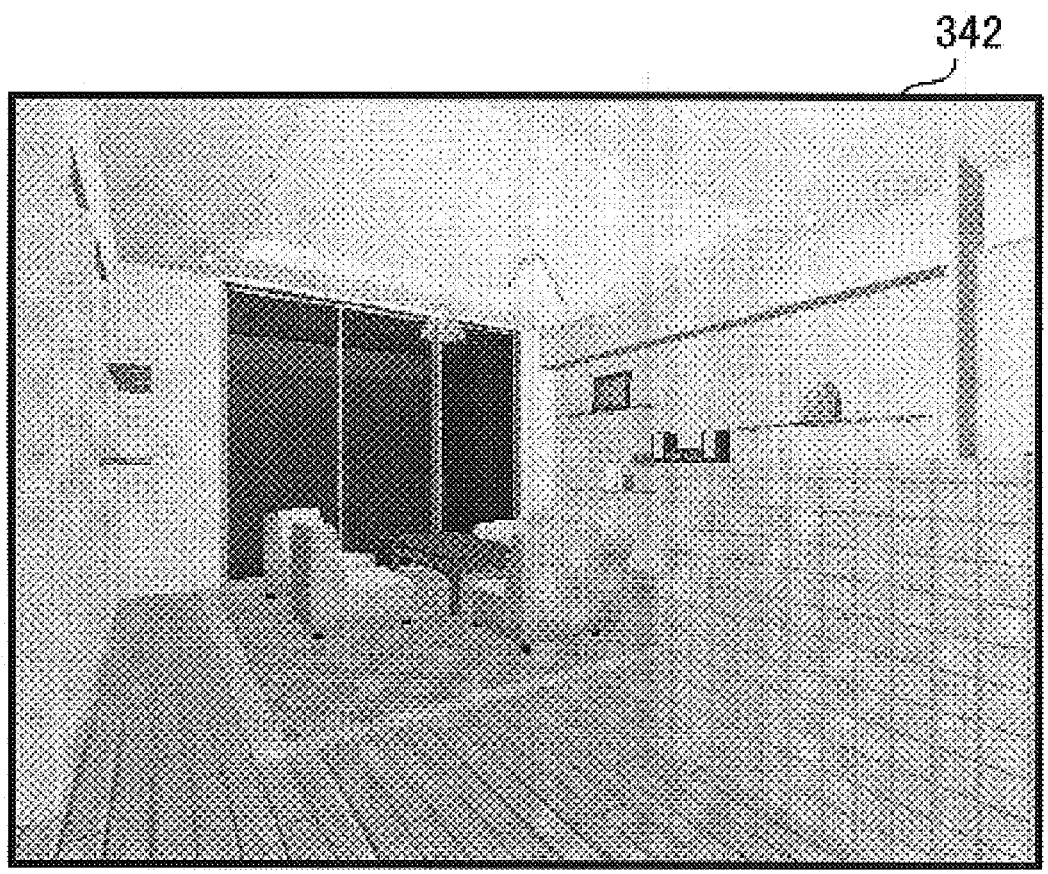
FIG. 17 shows an example of a picture produced with a fixed up vector.

If the user initiates a movement in fixed up-direction mode (i.e., issues a walk-through command) in the above-described situation, the up vector U will be adjusted to the vertical direction of the three-dimensional virtual space. The result is shown in FIG. 17. This picture 342 shows images of walls, chairs, and other objects, which are represented by many line segments. Every line segment that is vertical in the three-dimensional virtual space appears vertically in the picture 342 created in fixed up-direction mode, making it easier for the user to walk through the virtual space.

As described above, an accepted walk-through command will automatically correct the up vector orientation so that it will be opposite to the gravity. Since this mode mimics what people would normally see when they are walking in the real world, the user can move the eye point easily from one location to another in a three-dimensional virtual space.

Figure 18:
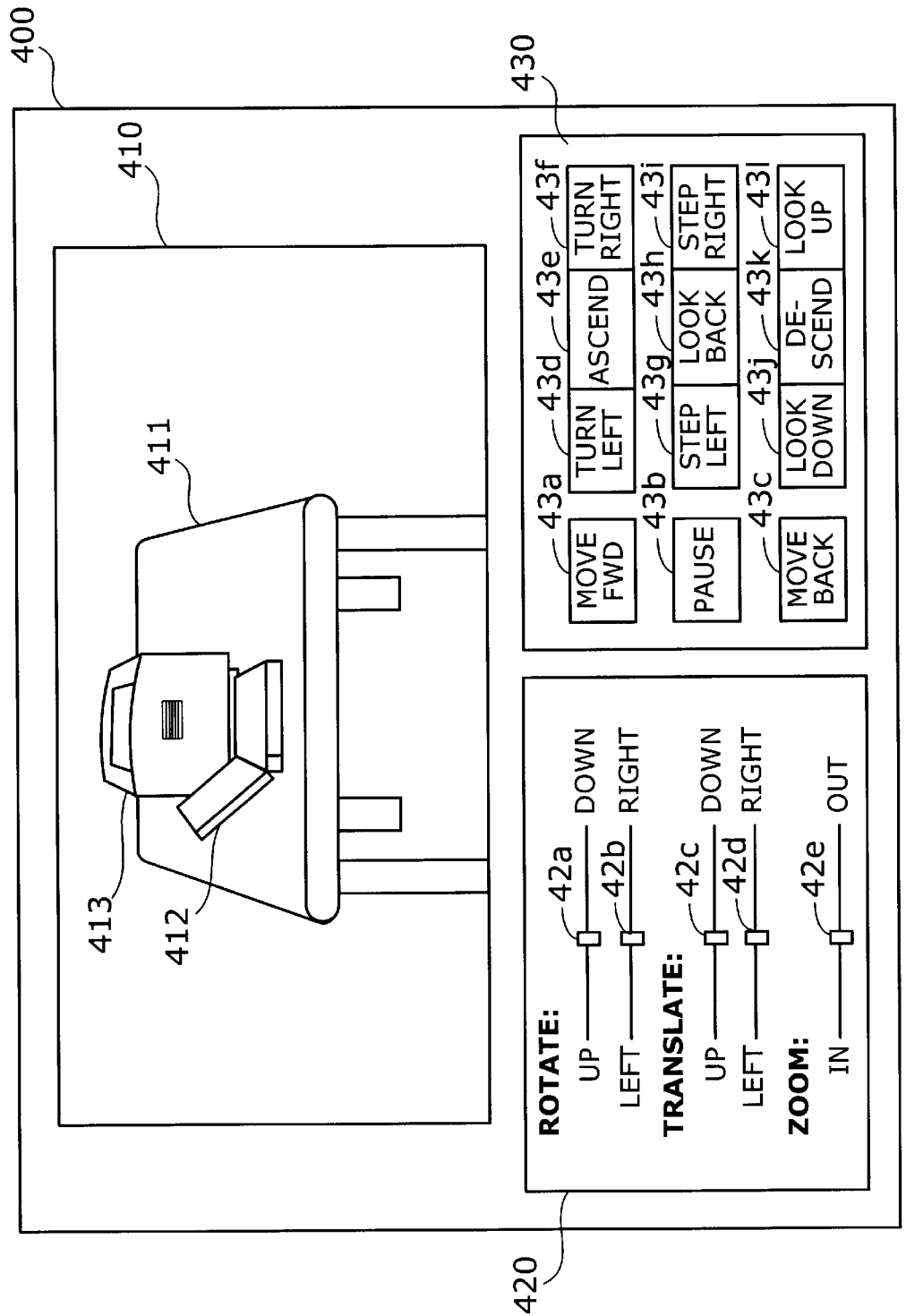
FIG. 18 shows an example of a screen layout where control bars are employed as part of a user interface.
Figure 19:
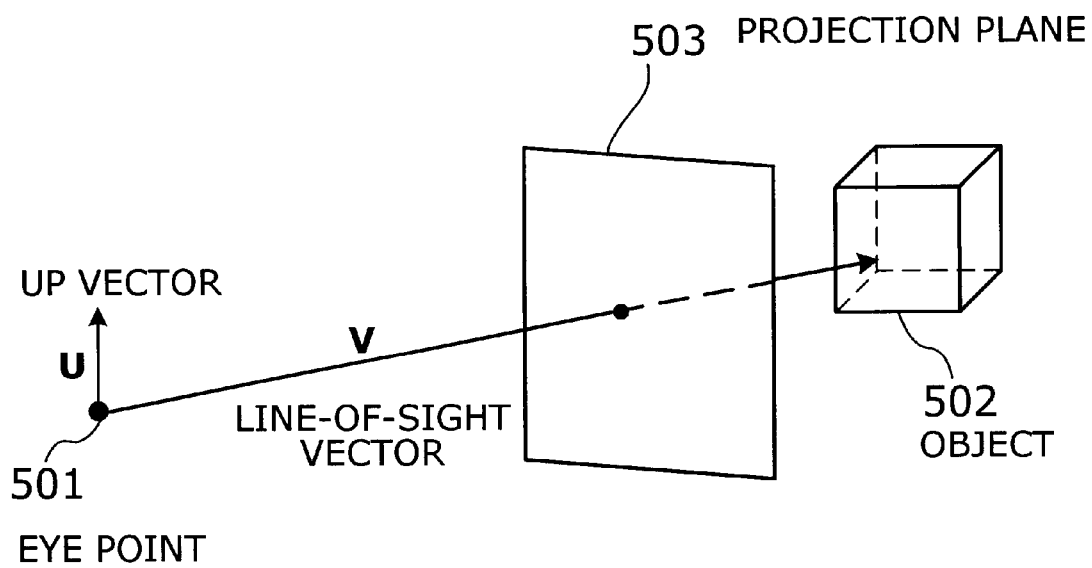
FIG. 19 shows a conventional model of a three-dimensional virtual space.

While the above discussion has assumed the use of on-screen buttons to manipulate the eye point in variable up-direction mode, the present invention should not be limited to this specific implementation. One possible alternative is to use control bars, instead of buttons. FIG. 18 shows an example of a screen layout where control bars are employed as part of the user interface. This monitor screen 400 has the following areas and elements: a video display window 410, a group of control bars 420 for flexible up-direction mode, and a group of buttons 430 for fixed up-direction mode.

The video display window 410 presents motion pictures created by repeating perspective projection of objects in a three-dimensional virtual space at predetermined intervals. In the example of FIG. 18, the video display window 410 contains images of a table object 411, a computer object 412, and a printer object 413. For the purpose of eye point manipulation in variable up-direction mode, the control bar group 420 contains five individual control bars 42a to 42e. The function of each control bar is as follows.

The first control bar 42a is used to rotate the eye point upward or downward. More specifically, a rotate-up command is issued by moving the first control bar 42a from center to left. Likewise, a rotate-down command is initiated by moving the first control bar 42a from center to right. In those operations, a larger displacement from the central position gives a faster rotation.

The second control bar 42b is used to rotate the eye point to the left or right direction. More specifically, a rotate-left command is issued by moving the second control bar 42b from center to left. Likewise, a rotate-right command is initiated by moving the second control bar 42b from center to right. In those operations, a larger displacement from the central position gives a faster rotation.

The third control bar 42c is used to translate the eye point and line of sight to the upper or lower level. More specifically, a translate-up command is issued by moving the third control bar 42c from center to left. Likewise, a translate-down command is initiated by moving the third control bar 42c from center to right. In those operations, a larger displacement from the central position gives a faster translation.

The fourth control bar 42d is used to translate the eye point and line of sight to the left or right direction. More specifically, a translate-left command is issued by moving the fourth control bar 42d from center to left. Likewise, a translate-right command is initiated by moving the fourth control bar 42d from center to right. In those operations, a larger displacement from the central position gives a faster translation.

The fifth control bar 42e is used to enlarge or shrink the image of objects. More specifically, a zoom-in command is issued by moving the fifth control bar 42e from center to left. Likewise, a zoom-out command is initiated by moving the fifth control bar 42e from center to right. In those operations, a larger displacement from the central position accelerates the enlargement or shrinkage (or results in an increased speed of the eye point moving forward to or away from a particular object of interest).

The button group 430 on the right-hand side of the monitor screen 400 contains a plurality of individual buttons 43a to 43l for eye point manipulation in fixed up-direction mode. For their detailed functions, see an earlier section that describes FIG. 9.

The processing mechanisms proposed above are actually implemented as software functions of a computer system, the instructions being encoded and provided in the form of computer programs. The computer system executes these programs to provide the intended functions of the present invention. Such programs are stored in a computer-readable medium for the purpose of storage and distribution. Suitable computer-readable storage media include magnetic storage media, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are particularly suitable for the circulation of the programs. Network-based distribution of software programs is also possible, in which the client program files stored in a server computer are downloaded to client computers via the network.

The computer stores the programs in its local storage unit, which have been previously installed from a portable storage media or downloaded from a server computer. The computer provides intended functions by executing those programs read out of its local storage unit. As an alternative way of program execution, the computer may execute the programs directly from the portable storage media. Another alternative method is that a server computer supplies the computer with necessary programs dynamically, allowing the computer to execute them upon delivery.

While the above embodiment produces a motion picture, the present invention should not be limited to any specific type of image generation. The present invention may also be applied to a program or apparatus for producing, for example, multiple still images to represent an object placed in a three-dimensional virtual space.

The above discussion is summarized as follows. According to the present invention, the object displaying program and apparatus are configured to determine the up direction of the projection plane according to a specified movement mode. In fixed up-direction mode, the up direction is set to a predetermined direction, while, in variable up-direction mode, the up direction is calculated with predetermined rules. This feature of the present invention provides the user with both flexibility and ease of use in moving the eye point, thus improving the usability of three-dimensional image generation systems.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A program product, which is stored in a computer-readable medium, for use with a computer, for drawing and displaying an image of given objects in a three-dimensional virtual space, the program product causing the computer to perform the steps of:

(a) determining which movement mode to use, according to a given user action;
   (b) calculating eye point coordinates and a line-of-sight vector, according to the given user action and the determined movement mode;
   (c) when the determined movement mode is fixed up-direction mode, setting an up direction of a projection plane to a predetermined direction;
   (d) when the determined movement mode is variable up-direction mode, determining the up direction of the projection plane according to predetermined rules;
   (e) performing a perspective transformation of the given objects onto the projection plane being oriented to the determined up direction, based on the determined eye point coordinates and line-of-sight vector, thereby creating an image of the given objects; and
   (f) displaying the created image.

2. The program product according to claim 1, wherein said determining step (d) sets the up direction of the projection plane as being perpendicular to the line-of-sight vector.

3. The program product according to claim 1, wherein said setting step (c) sets the up direction of the projection plane as being equal to that of the three-dimensional virtual space.

4. The program product according to claim 1, wherein said calculating step (b) determines the eye point coordinates and line-of-sight vector according to relationships thereof with a particular object of interest specified from among the given objects, when the determined movement mode is the variable up-direction mode.

5. The program product according to claim 1, wherein:
   the program product provides first and second user interfaces to interact with a user thereof, the first user interface being designed for the fixed up-direction mode, the second user interface being designed for the variable up-direction mode; and
   said determining step (a) determines which movement mode to use by identifying which of the two user interfaces has been used to make the user action.

6. An apparatus for drawing and displaying an image of given objects in a three-dimensional virtual space, comprising:
   mode determination means for determining which movement mode to use, according to a given user action;
   eye point parameter calculation means for calculating eye point coordinates and a line-of-sight vector, according to the given user action and the determined movement mode;
   up direction determination means for setting an up direction of a projection plane to a predetermined direction when the determined movement mode is fixed up-direction mode, and determining the up direction of the projection plane according to predetermined rules when the determined movement mode is variable up-direction mode;
   drawing means for performing a perspective transformation of the given objects onto the projection plane being oriented to the determined up direction, based on the determined eye point coordinates and line-of-sight vector, thereby creating an image of the given objects; and
   display means for displaying the image created by said drawing means.

7. The apparatus according to claim 6, wherein said up direction determination means sets the up direction of the projection plane as being perpendicular to the line-of-sight vector, when the determined movement mode is the variable up-direction mode.

8. The apparatus according to claim 6, wherein said up direction determination means sets the up direction of the projection plane as being equal to that of the three-dimensional virtual space, when the determined movement mode is the fixed up-direction mode.

9. The apparatus according to claim 6, wherein said eye point parameter calculation means determines the eye point coordinates and line-of-sight vector according to relationships thereof with a particular object of interest specified from among the given objects, when the determined movement mode is the variable up-direction mode.

10. The apparatus according to claim 6, further comprising:
    a first user interface to interact with a user in the fixed up-direction mode, and
    a second user interface to interact with the user in the variable up-direction mode;
    wherein said mode determination means determines which movement mode to use by identifying which of said two user interfaces has been used to make the user action.

11. A method of drawing and displaying an image of given objects in a three-dimensional virtual space, comprising the steps of:

(a) determining which movement mode to use, according to a given user action;
    (b) calculating eye point coordinates and a line-of-sight vector, according to the given user action and the determined movement mode;
    (c) when the determined movement mode is fixed up-direction mode, setting an up direction of a projection plane to a predetermined direction;
    (d) when the determined movement mode is variable up-direction mode, determining the up direction of the projection plane according to predetermined rules;
    (e) performing a perspective transformation of the given objects onto the projection plane being oriented to the determined up direction, based on the determined eye point coordinates and line-of-sight vector, thereby creating an image of the given objects; and
    (f) displaying the created image.

12. A computer-readable medium storing a program which draws and displays an image of given objects in a three-dimensional virtual space, the program causing a computer to perform the steps of:
  (a) determining which movement mode to use, according to a given user action;
  (b) calculating eye point coordinates and a line-of-sight vector, according to the given user action and the determined movement mode;
  (c) when the determined movement mode is fixed up-direction mode, setting an up direction of a projection plane to a predetermined direction;
  (d) when the determined movement mode is variable up-direction mode, determining the up direction of the projection plane according to predetermined rules;
  (e) performing a perspective transformation of the given objects onto the projection plane being oriented to the determined up direction, based on the determined eye point coordinates and line-of-sight vector, thereby creating an image of the given objects; and
  (f) displaying the created image.

* * * * *